United States Patent
Zhao et al.

(10) Patent No.: US 9,660,564 B2
(45) Date of Patent: May 23, 2017

(54) OPTIMIZED CONTROL FOR SYNCHRONOUS MOTORS

(71) Applicant: Infineon Technologies AG, Neubiberg (DE)

(72) Inventors: Tao Zhao, Singapore (SG); Arno Rabenstein, Singapore (SG); Theng Kiong Gan, Singapore (SG); Choon Keat Kok, Singapore (SG); Sze Main Wong, Singapore (SG)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 14/274,664

(22) Filed: May 9, 2014

(65) Prior Publication Data

US 2016/0359442 A1 Dec. 8, 2016

Related U.S. Application Data

(60) Provisional application No. 61/822,422, filed on May 12, 2013, provisional application No. 61/822,425, filed on May 12, 2013.

(51) Int. Cl.
*H02P 21/00* (2016.01)
*H02P 27/08* (2006.01)
*H02P 6/08* (2016.01)

(52) U.S. Cl.
CPC ............ *H02P 21/0021* (2013.01); *H02P 6/08* (2013.01); *H02P 27/08* (2013.01)

(58) Field of Classification Search
CPC ............ H01L 2924/00; Y02T 10/7005; B60L 2220/14; H02P 1/06; H02P 6/00
See application file for complete search history.

(56) References Cited

U.S. PATENT DOCUMENTS

| | | |
|---|---|---|
| 5,854,547 A | 12/1998 | Nakazawa |
| 6,166,514 A | 12/2000 | Ando et al. |
| 7,339,333 B2 | 3/2008 | Chen et al. |
| 7,514,896 B2 | 4/2009 | Imura et al. |
| 9,263,979 B2 | 2/2016 | Zhang et al. |
| 2005/0088135 A1* | 4/2005 | Sato ............... H02P 27/047 318/717 |
| 2008/0191656 A1* | 8/2008 | Satake ............. B60L 11/1803 318/722 |
| 2014/0253000 A1* | 9/2014 | Gebregergis ........ H02P 21/28 318/400.02 |
| 2014/0265951 A1* | 9/2014 | Gebregergis ........ H02P 21/22 318/400.02 |

(Continued)

FOREIGN PATENT DOCUMENTS

| DE | 102008045622 A1 | 4/2010 |
|---|---|---|
| JP | H0114394 A | 6/1989 |

(Continued)

*Primary Examiner* — Shawki S Ismail
*Assistant Examiner* — Zoheb Imtiaz
(74) *Attorney, Agent, or Firm* — Eschweiller & Potashnik, LLC

(57) ABSTRACT

Representative implementations of devices and techniques provide optimized control of a three-phase AC motor. A field oriented control (FOC) arrangement uses optimization components and techniques to improve power efficiency of the motor, with fast control response over a full range of motor speeds.

23 Claims, 31 Drawing Sheets

(56) References Cited

U.S. PATENT DOCUMENTS

| | | | | |
|---|---|---|---|---|
| 2014/0265953 A1* | 9/2014 | Collier-Hallman | ....... | H02P 7/06 318/400.02 |
| 2014/0265961 A1* | 9/2014 | Gebregergis | ........... | B62D 5/046 318/400.23 |
| 2014/0265962 A1* | 9/2014 | Gebregergis | ........... | B62D 5/046 318/400.23 |
| 2014/0266295 A1* | 9/2014 | Erlenbeck | ............ | B62D 5/0487 324/765.01 |
| 2014/0320308 A1* | 10/2014 | Lewis | ...................... | H04Q 9/00 340/870.07 |

FOREIGN PATENT DOCUMENTS

| | | |
|---|---|---|
| JP | H06351264 A | 12/1994 |
| JP | 2006129698 A | 5/2006 |
| JP | 2012120409 A | 6/2012 |

* cited by examiner (a)

(b) $\delta < 0$ and $\varepsilon < 0$ (a) $\delta > 0$ and $\varepsilon > 0$ (b) $\delta = 0$ and $\varepsilon = 0$ (a)

(b)

(a)

(b)

OPTIMIZED CONTROL FOR SYNCHRONOUS MOTORS

RELATED APPLICATIONS

This application is a non-provisional application of provisional application 61/822,422, which was filed on May 12, 2013. The entire contents of the indicated provisional application are hereby incorporated herein by reference.

BACKGROUND

Permanent Magnet Synchronous Motors (PMSM) have growing adoption in consumer and industrial motor applications due to their higher reliability and smaller size compared to other motors. To achieve high efficiency and low vibration and acoustic noise, Field Oriented Control (FOC) schemes are increasingly being used in consumer and industrial PMSM control for fans, pumps, compressors, geared motors, and so forth.

For highly dynamic loading (e.g., motors for electric propulsion, compressors, etc.), a fast and accurate FOC control loop can be used to control motor currents and voltages to maintain maximum efficiency. On the other hand, existing FOC schemes often have complex transformations in the critical control loop, which can make them inaccurate and relatively slow.

To further improve efficiency at the lowest cost, increasingly more control functions (e.g., digital power conversion, digital Power Factor Correction (PFC), FOC control of multiple motors, etc.) are often handled by fewer microcontrollers. New microcontrollers also include increasingly more features and peripherals (e.g., Human Machine Interfaces, communications, etc.) in order to excel in the intensely fierce market competition. However, existing FOC control strategies can be complicated and processor-intensive, tending to overburden the microcontrollers and impeding microcontroller power from being allocated to complex system functions efficiently, and hindering the full usage of microcontroller potential and features.

Existing rotor position and speed estimators for sensorless FOC include a flux estimator, a PLL estimator, Sliding-Mode Observer (SMO), and so forth. All of these can be sensitive to motor stator resistance R, and the fluctuating stator resistance (mainly due to temperature changes) can cause unpredictable errors to the estimated rotor position and speed, causing the control to become unstable particularly at low motor speed. Furthermore, with imprecise position and speed information in sensorless FOC, the stator flux and rotor flux may not always be perpendicular to each other and consequently the energy efficiency may not be maximized all the time. Some techniques have been proposed to compensate the stator resistance variations, such as online stator resistance re-estimation/tracking/recalibration and stator resistance adaptation in sensorless PMSM drives, but they can be complex and consume more resources, including processor time.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure.

DETAILED DESCRIPTION

Overview

As an optimized technique, field oriented control (FOC) (i.e., vector control) is a method of variable speed control for three-phase alternate current (AC) electric motors, to improve power efficiency with fast control response over a full range of motor speeds.

Various implementations of structures, components, and techniques for providing optimized control of three-phase AC motors are discussed in this disclosure. Structures, components, and techniques are discussed with reference to example three-phase Permanent Magnet Synchronous Motor (PMSM) devices and control systems illustrated in the figures. However, this is not intended to be limiting, and is for ease of discussion and illustrative convenience. The techniques and devices discussed may be applied to many of various motor designs, control structures, and the like (e.g., single-phase and three-phase variable frequency drives, digital phase converters, three-phase and single-phase motors, induction motors, regenerative drives, etc.), and remain within the scope of the disclosure.

Implementations are explained in more detail below using a plurality of examples. Although various implementations and examples are discussed here and below, further implementations and examples may be possible by combining the features and elements of individual implementations and examples.

Figure 1:
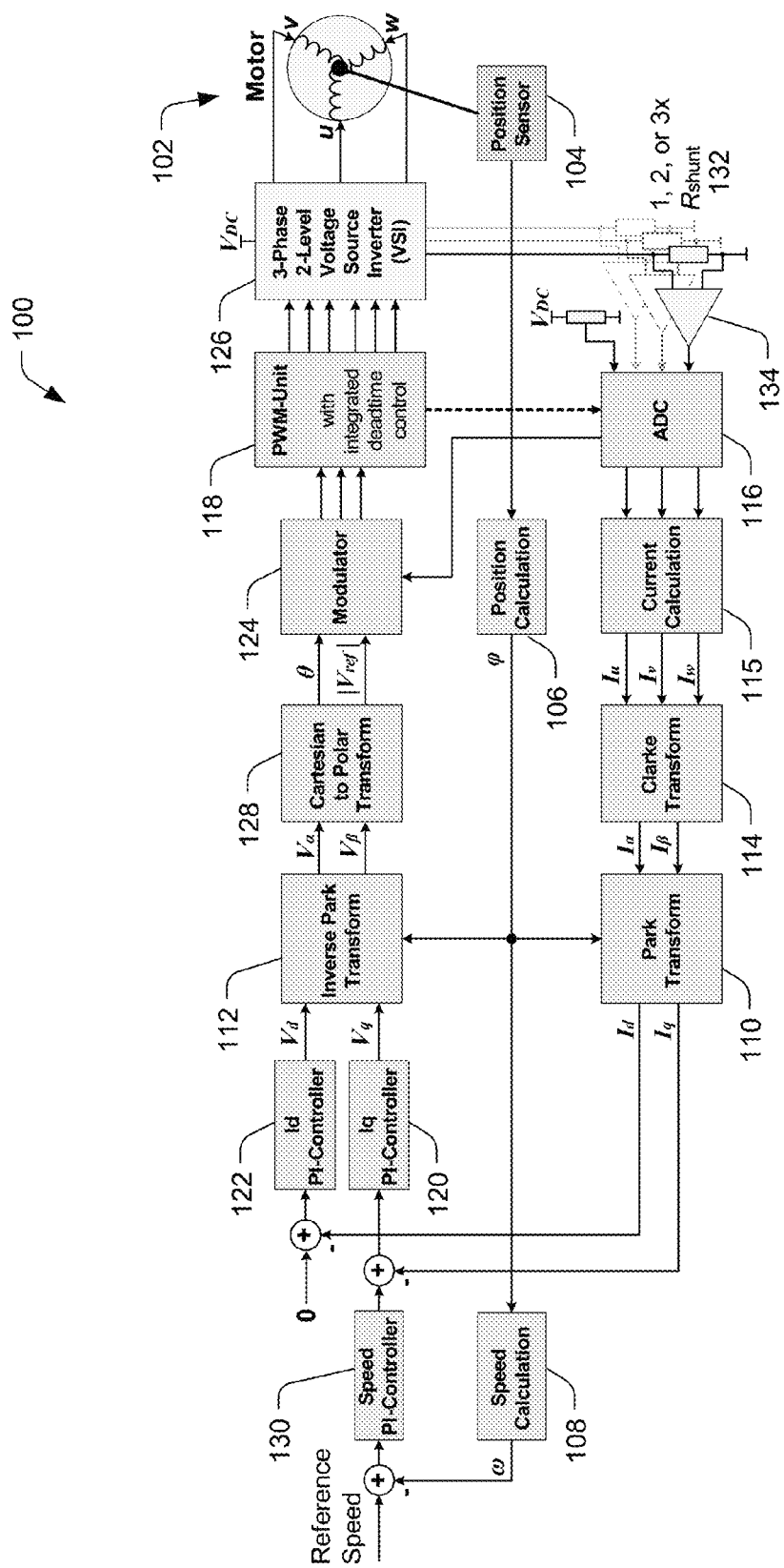
FIG. 1 is a block diagram of an example field oriented control (FOC) arrangement, using a position sensor to determine rotor position and/or speed, wherein the techniques and devices disclosed herein may be applied, according to an implementation.
Figure 2:
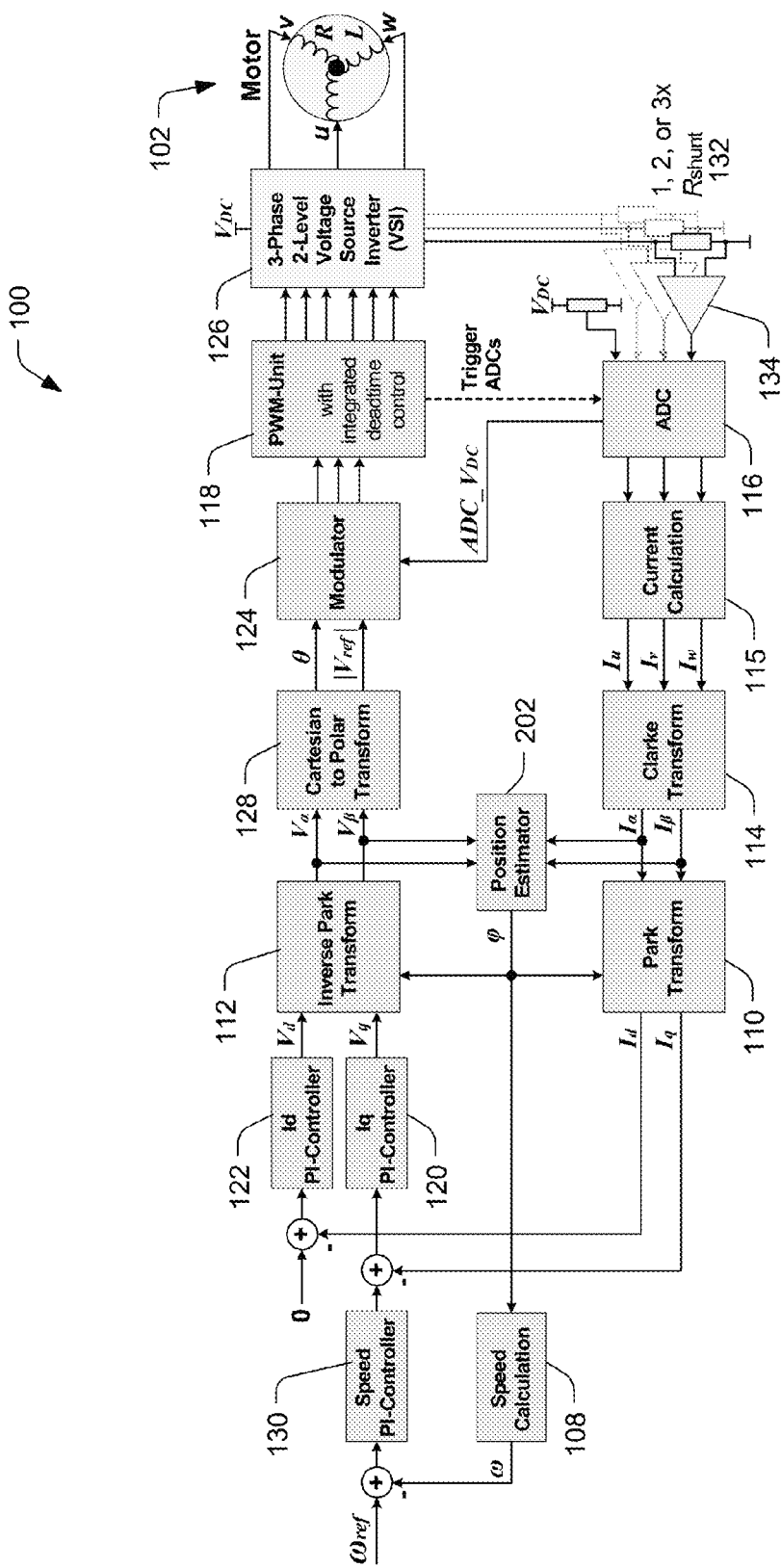
FIG. 2 is a block diagram of another example FOC arrangement, using a position estimator to determine rotor position and/or speed, wherein the techniques and devices disclosed herein may be applied, according to an implementation.

FIGS. 1 and 2 are block diagrams of an example field oriented control (FOC) structure arrangement 100, wherein the techniques and devices described herein may be applied. A reference speed (e.g., desired rotational speed for the motor 102) is received at the input side, and a pulse-width modulated (PWM) motor voltage output signal (e.g., three-phase) is output to the motor 102. The example FOC arrangement 100 shown in FIG. 1 is a sensored version, using a position sensor 104 to determine the rotor position and/or speed, via position calculation 106 and speed calculation 108 modules. The example FOC arrangement 100 shown in FIG. 2 is a sensorless version, using a position estimator 202 to determine the rotor position and/or speed, via speed calculation module 108.

In an example, a FOC structure arrangement 100 transforms three phase signals into two rotor-fixed signals (e.g., in the d,q coordinate system) and vice versa with complex Cartesian reference frame transformations (e.g., Park Transform 110 and Inverse Park Transform 112) in a control loop which is desired to have a fast response. These reference frame transformations can be computation-intensive and can also introduce extra calculation errors, resulting in an undesirably slow current control loop and in poor response to dynamic motor loads. This can make it difficult to handle increasingly more composite system functions (e.g., digital power factor correction, multiple FOC motor controls, digital power conversion, etc.) with a single microcontroller.

Normally, as shown in FIGS. 1 and 2, the FOC structure arrangement 100 uses a Clarke Transform 114 to transform 3-phase currents Iu, Iv, and/or Iw output from current calculation stage 115 (as measured by the analog-to-digital converter (ADC) 116; the ADC conversion can be triggered by PWM unit 118, or the like) to a stationary α-β reference frame as Iα and Iβ (which are sinusoidal signals in steady state). The Park Transform 112 is used to transform Iα and Iβ to another rotor coordinate system d-q, as Id and Iq, respectively. Id and Iq are feedback signals of the FOC 100 control loop and are nearly constants at steady state.

PI controllers 130, 120, and 122 are used for speed and current controls separately, to achieve controllable motor speed, torque and air gap flux. In general, the flux generating component Id is controlled to 0. It is also possible to control Id to negative values (i.e., flux-weakening control) to extend the operating speed range of the motor 102. The speed PI controller 130 output is the reference current for the torque generating component Iq. The PI controllers 120, 122 output the voltages Vd and Vq, that the motor 102 phases should have in the d-q reference frame, for the desired rotational speed of the motor 102. Vd and Vq are also nearly constants in steady state.

In various examples, Inverse Park Transform 112 is used to transform resultant voltages Vd and Vq to the stationary α-β reference frame as Vα and Vβ, which are sinusoidal signals in steady state. The amplitude and angle of the voltage vector (Vα, Vβ) is the reference voltage for the space vector modulation (SVM) modulator 124, which is used to control the PWM unit 118, to create 3-phase sinusoidal waveform outputs from the 3-phase 2-level voltage inverter 126, to drive the motor 102 phases.

In some cases, the Cartesian to Polar Transform 128 can be neglected if it is not desired for the microcontroller to perform the Cartesian to Polar Transform calculations. In that case, the voltages Vα and Vβ can be sent to the SVM modulator 124 directly. If desired, the ADC 116 value of the inverter 126 DC link voltage (VDC) (often a voltage divider is used) can also be obtained regularly for SVM 124 calculations. The above described control loops repeat themselves to realize required motor 102 control.

The rotor position φ and speed ω may be obtained from a rotor position sensor 104 (such as encoder, resolver, Hall sensors, etc.) for a sensored FOC arrangement 100, as shown in FIG. 1, or a position estimator 202 for a sensorless FOC arrangement 100, as shown in FIG. 2. The rotor position and speed calculations and the speed PI control 130 comprise a slow control loop, as the motor mechanical time constant is typically much larger than the electrical time constant. The other computing blocks shown in FIGS. 1 and 2 comprise a fast current control loop and should be computed as fast as possible.

A sensorless FOC structure arrangement 100, such as shown in FIG. 2 can be a better choice than a sensored version for some cost-sensitive consumer and industrial motor drives such as fans, pumps, compressors and geared motors. For example, the sensorless FOC arrangement 100 often uses a software rotor position and speed estimator 202 instead of more costly sensor(s) (such as encoder, magnetic angle sensor, Hall sensors, etc.). In automotive solutions, or the like, a sensorless FOC arrangement 100 can be included as a redundant system to back up a sensored version, if the sensor driven FOC arrangement 100 fails, for example.

Some rotor position and speed estimators 202 for sensorless FOC arrangements 100 use accurate motor 102 parameter information, such as stator resistance R and stator inductance L, to estimate rotor position and/or speed, and hence are sensitive to R and L variations. However, motor stator resistance R can be highly dependent on temperature. For example, the resistance of copper and aluminum, the common motor winding materials, increases more than 15% if the temperature rises 40° C. from 20° C. (the resistivity temperature coefficients of copper and aluminum are about +0.39%/° C. at 20° C.). Such random resistance variations can introduce errors to the position and speed estimators 202 and can aggravate control performance, especially at low speeds.

Additionally, some sensorless FOC arrangements 100 can be very complex and often use three PI controllers, making it difficult and time-consuming to achieve smooth motor startup and to fine-tune for the best system performance with specified motors. With imprecise position and speed information in sensorless FOC, the stator flux and rotor flux may not always be perpendicular to each other and consequently the energy efficiency may not be maximized all the time.

The disclosed FOC control techniques and structures include optimized and faster control loops, and decreased CPU time utilization. Without Inverse Park Transform 112, the FOC arrangement 100 can optimize and speed-up the fast control loop, which will benefit the FOC motor control with highly dynamic loading (such as compressor, motor for electric propulsion). It also reduces CPU load and saves precious CPU time for other purposes (e.g., digital PFC, multiple FOC motor drive, HMI, communications) in sophisticated systems, hence the microcontroller's potential and features can be used sufficiently. Conversely, with optimized FOC users could select a microcontroller with less computation power and lower cost to accomplish FOC motor controls of the same quality.

In various implementations, one or more of the FOC arrangement 100 modules or components (e.g., PI controllers 120, 122, 130, transforms 110, 112, 114, 128, 1302, 1402, 1802, 1902, 2102, modulator 124, calculations 108, 115), as well other components, may be implemented in hardware, firmware, software, or the like, or in combinations thereof.

Furthermore, some of the disclosed techniques may be readily implemented in software using object or object-oriented software development environments that provide portable source code that can be used on a variety of computer or workstation platforms. Alternatively, the disclosed techniques and/or arrangements may be implemented partially or fully in hardware using standard logic circuits or VLSI design.

Moreover, the disclosed procedures may be readily implemented in software that can be stored on a computer-readable storage medium (such as a memory storage device), executed on programmed general-purpose computer with the cooperation of a controller and memory, a special purpose computer, a microprocessor, or the like. In these instances, the arrangements and procedures of the described implementations may be implemented as program embedded on personal computer such as an applet, JAVA® or CGI script, as a resource residing on a server or computer workstation, as a routine embedded in a dedicated communication arrangement or arrangement component, or the like. The arrangements may also be implemented by physically incorporating the arrangements and/or procedures into a software and/or hardware system, such as the hardware and software systems of a test/modeling device.

Example Coordinate Systems for FOC Arrangements

In various implementations, the FOC structure arrangement 100 may use the following coordinate systems for a 3-phase single pole-pair PMSM motor (additionally, the disclosure may be equally applicable to multi-pole-pair motors and other types of motors). A summary of the coordinate systems is given below, including explanations of the coordinate systems and their relationships.

| Coordinate System | | Stationary | Rotating |
| --- | --- | --- | --- |
| 3-phase (electrically 120° separated) | uvw | ✓ | |
| Cartesian (electrically orthogonal) | α-β | ✓ | |
| | d-q | | ✓ |
| Polar | Ou | ✓ | |
| | Od | | ✓ |

Throughout this document it is assumed that the motor 102 rotates in the positive direction (i.e., in the counter-clockwise direction), so the angles and angular speeds are positive numbers. The signs of the angles and angular speeds may be changed for a motor 102 that rotates in the negative direction (i.e., in the clockwise direction).

Figure 3:
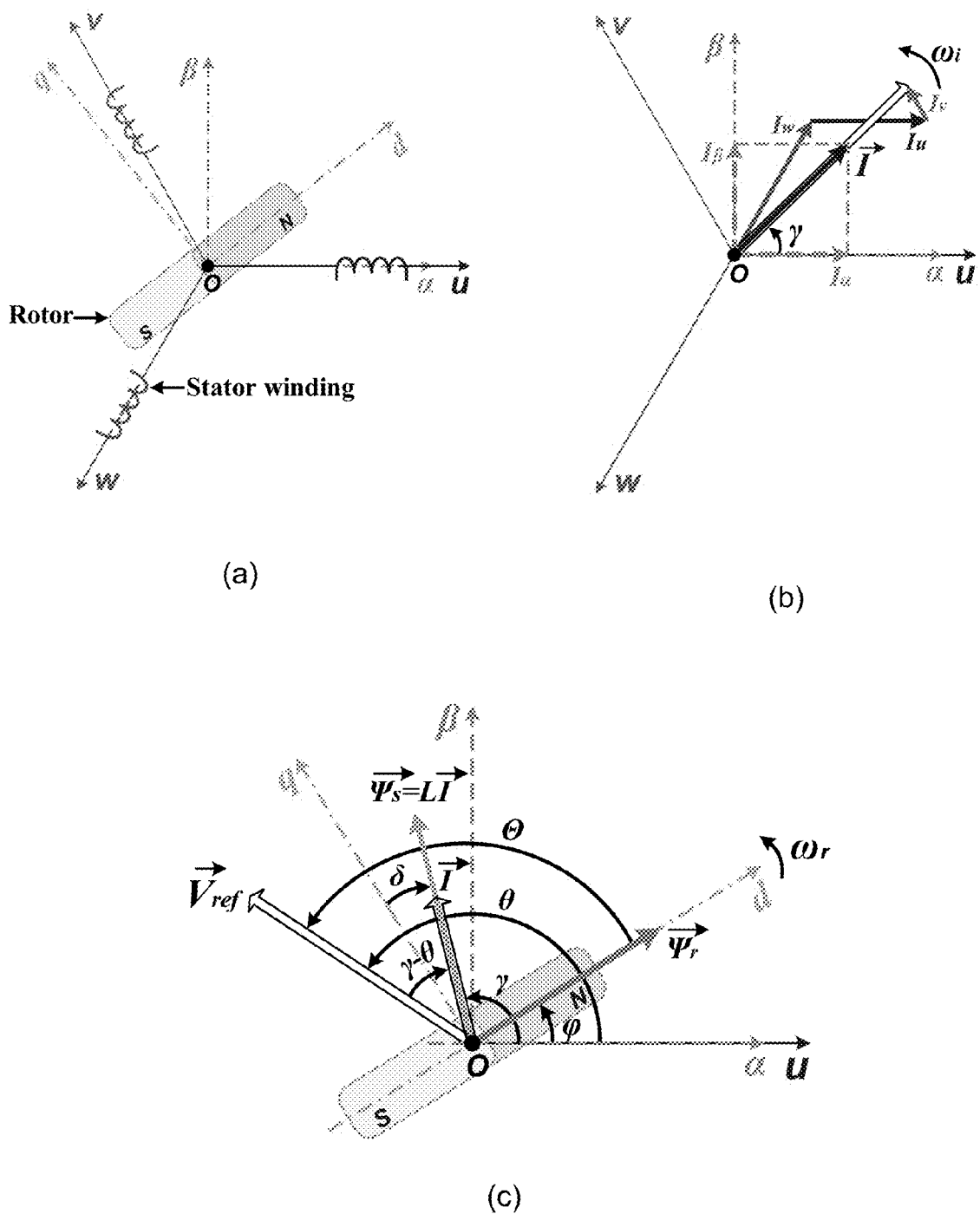
FIG. 3 is a set of illustrations showing different example coordinate systems, where some (dq and 0d coordinate systems) are fixed to the moving rotor of a three-phase electric motor, and others (uvw, αβ, and 0u) are stationary (or fixed to the motor stator), and vector representations, including rotating space vectors, of the same.

As shown in FIG. 3, coordinate systems may be referenced to the stator and/or the rotor of the motor. For example, the d-q Cartesian coordinate system is fixed to the rotor and the components of the d-q coordinate system rotate together. The direct axis Od is oriented in the direction from the rotor permanent magnet south pole (S) to north pole (N). The other quadrature axis Oq is perpendicular to the rotor flux (e.g., to the rotor).

As shown in FIG. 3(*b*), the 3-phase 120° separated sinusoidal currents Iu, Iv, and Iw of the motor stator windings will generate three non-rotating but pulsating magnetic fields in the u, v, and w directions respectively, resulting in a rotating magnetic field (stator flux space vector). Vector addition of Iu, Iv, and Iw gives a current space vector $\vec{I}$ (its magnitude can be scaled down or up but with no change of direction) rotating at speed ωi.

In a stationary α-β reference frame, $\vec{I}$ has Cartesian coordinates Iα and Iβ, as shown in FIG. 3. The rotating stator flux space vector $\vec{\Psi}_S$ has the same direction as $\vec{I}$, with the magnitudes proportional to each other, as shown in FIG. 3(c). The rotating current space vector $\vec{I}$ can represent the rotating stator magnetic flux $\vec{\Psi}_S$. For example, in various implementations, it is easier to control the rotating stator flux $\vec{\Psi}_S$ by controlling the magnitude and direction of the single current space vector $\vec{I}$, instead of controlling three sinusoidal currents Iu, Iv, and Iw.

Similarly, vector addition of 3-phase 120° separated stator phase voltages Vu, Vv, and Vw gives a rotating voltage space vector $\vec{V}_{ref}$. Also, a rotating rotor permanent magnet generates a rotating rotor magnetic flux space vector $\vec{\Psi}_r$.

The magnitudes and directions of the above-mentioned rotating space vectors can be represented by the radial coordinates and polar angles in polar coordinate systems, as shown in FIG. 3. Their coordinates in different coordinate systems are shown below:

| Space Vector | Coordinates in Different Coordinate Systems | | | | |
|---|---|---|---|---|---|
| | uvw | α-β | d-q | Ou | Od |
| $\vec{I}$ | $I_u, I_v, I_w$ | $I_\alpha, I_\beta$ | $I_d, I_q$ | $|I|, \gamma$ | — |
| $\vec{V}_{ref}$ | $V_u, V_v, V_w$ | $V_\alpha, V_\beta$ | $V_d, V_q$ | $|V_{ref}|, \theta$ | $|V_{ref}|, \Theta$ |
| $\Psi_s$ | $LI_u, LI_v, LI_w$ | $LI_\alpha, LI_\beta$ | $LI_d, LI_q$ | $L|I|, \gamma$ | — |
| $\Psi_r$ | — | $\Psi_{r\alpha}, \Psi_{r\beta}$ | $|\Psi_r|, 0$ | $|\Psi_r|, \phi$ | — | where:

$\vec{I}$—Stator current space vector, with magnitude $|I|$ and angle $\gamma$.

$\vec{V}_{ref}$—Stator voltage space vector, with magnitude $|V_{ref}|$ and angle $\theta$.

$\vec{\Psi}_S$—Stator magnetic flux space vector, $\vec{\Psi}_S = L\vec{I}$. It points to the same direction of the current space vector $\vec{I}$.

L—Stator winding inductance per phase.

$\vec{\Psi}_r$—Rotor permanent magnet flux linkage space vector with magnitude $|\Psi_r|$. $|\Psi_r|$ can be derived from the voltage constant, speed constant, or torque constant in motor specifications. As shown below, the back electromotive force (BEMF) magnitude is $|\omega_r \Psi_r|$.

$\phi$—Rotor electrical angular position.

$\gamma$—Angle of current space vector in stationary Ou polar coordinate system.

$\Phi$—Angle of voltage space vector in rotating Od polar coordinate system.

$\theta$—Angle of voltage space vector in stationary Ou polar coordinate system, $\theta = \Phi + \phi$.

In the stationary polar coordinate system Ou, the rotating space vectors can be written in polar form of complex numbers as follows:

$$\vec{I} = |I| \cdot e^{j\gamma} \quad (1)$$

$$\vec{V}_{ref} = |V_{ref}| \cdot e^{j\theta} \quad (2)$$

$$\vec{\Psi}_S = L\vec{I} = L|I| \cdot e^{j\gamma} \quad (3)$$

$$\vec{\Psi}_r = |\Psi_r| \cdot e^{j\phi} \quad (4)$$

where:

e—Euler's number (i.e., the base of the natural logarithm); e≈2.718281828.

j—Imaginary unit; $j = \sqrt{-1}$.

Referring to FIG. 4(a), an equivalent circuit of the electrical subsystem of a Permanent Magnet Synchronous Motor (PMSM) 102 is illustrated. The motor 102 equation (stator model) can be written as:

$$\vec{V}_{ref} = R\vec{I} + \frac{d\vec{\Psi}_s}{dt} + \frac{d\vec{\Psi}_r}{dt} \quad (5)$$

Considering Equations (1) through (4), Equation (5) can be rewritten as the following Equation (6) in the stationary polar coordinate system Ou. All of the angles are illustrated in FIG. 3(c).

$$|V_{ref}| \cdot e^{j\theta} = \underbrace{R|I| \cdot e^{j\gamma}}_{R \cdot \vec{I}} + \underbrace{L\frac{d|I|}{dt} \cdot e^{j\gamma} + \omega_i L|I| \cdot e^{j(\frac{\pi}{2}+\gamma)}}_{\frac{d\vec{\Psi}_s}{dt}} + \underbrace{\omega_r |\Psi_r| \cdot e^{j(\frac{\pi}{2}+\phi)}}_{\frac{d\vec{\Psi}_r}{dt}} \quad (6)$$

where:

R—Stator winding resistance per phase.

$R\vec{I}$—Voltage drop space vector due to the stator winding resistance.

$$\frac{d\vec{\Psi}_s}{dt}$$

—Electromotive force space vector induced by time-varying stator magnetic flux $$\frac{d\vec{\Psi}_r}{dt}$$

—BEMF space vector with magnitude of $|\omega_r \Psi_r|$. It is the electromotive force induced by time-varying rotor magnetic flux linkage, and is perpendicular to the rotor flux space vector.

$\omega_i$—Current space vector electrical angular speed, and $$\omega_i = \frac{d\gamma}{dt}.$$

$\omega_r$—Rotor electrical angular speed, and $$\omega_r = \frac{d\phi}{dt}.$$

π—Archimedes' constant (i.e., the ratio of a circle's circumference to its diameter), where π≈3.14159265359. Note that $$e^{j(\frac{\pi}{2})} = j.$$

In Equation (6), except two unknown variables ωr and φ, all other items are either constants $$\left(e.g., e, j, \frac{\pi}{2}\right),$$

motor 102 parameters (e.g., R, L and |Ψr|), measured and calculated values $$\left(e.g., |I|, \gamma, \frac{d|I|}{dt} \text{ and } \omega i\right),$$

or last control cycle calculation results, which are currently applying to motor phases (e.g., |Vref| and θ). Since a PMSM is a synchronous motor, the average electrical angular speed of the voltage space vector, the current space vector, and the rotor should be the same. So, for simplicity, the change in the angle of the voltage space vector over time can be written as:

$$\frac{d\theta}{dt} \approx \omega_i \approx \omega_r \approx \omega \approx \omega_{ref} \quad (7)$$

where:

ω—Measured speed by a position sensor, or estimated speed by a position estimator, e.g., the PI controller of the PLL observer, and $\omega_{ref}$—User-defined reference speed of motor 102.

Recalling that all of the terms of equation (6) are depicted in FIG. 3(c), integrating equation (6) and rearranging the results gives:

$$\vec{\Psi}_r = \int_0^t (\vec{V}_{ref} - R\vec{I})dt - L\vec{I} \quad (7.a)$$

Both sides of Equation (7.a) may be projected to stationary α-β axes to get the coordinates of rotor flux space vector:

$$\Psi_{r\alpha} = \int_0^t (V_\alpha - RI_\alpha)dt - LI_\alpha \quad (7.b)$$

$$\Psi_{r\beta} = \int_0^t (V_\beta - RI_\beta)dt - LI_\beta \quad (7.c)$$

In various implementations, $I_\alpha$ and $I_\beta$ are real-time measured and calculated current values. Additionally, $V_\alpha$ and $V_\beta$ are last control cycle calculation results and are applying to the motor 102 phases. In some examples, the integrations shown in Equations (7.b) and (7.c) can be simplified by replacing the integrations with low pass filters with a very low cut-off frequency. For sensorless FOC arrangements 100, the rotor position can be calculated by knowing the motor 102 parameters R and L. The flux position estimator is:

$$\varphi = \arctan\left(\frac{\Psi_{r\beta}}{\Psi_{r\alpha}}\right) \quad (7.d)$$

The rotor electrical speed is:

$$\omega = \frac{d\varphi}{dt} \quad (7.e)$$

For some sensorless FOC arrangements 100, the estimated rotor position $\hat{\varphi}$ can be obtained by an integrator 2302 (see FIGS. 23, 24, 26 and 27) as shown Equation (8) below. A digital implementation of the integration is achieved by accumulating the speed (which is scaled accordingly, if necessary) of every FOC loop.

$$\hat{\varphi} = \int \omega dt \quad (8)$$

The angle of the SVM 124 (of FIGS. 28, 29, 30, and 31) reference vector is shown below in Equation (8.a).

$$\theta = \int \omega_{ref} dt \quad (8.a)$$

Figure 4:
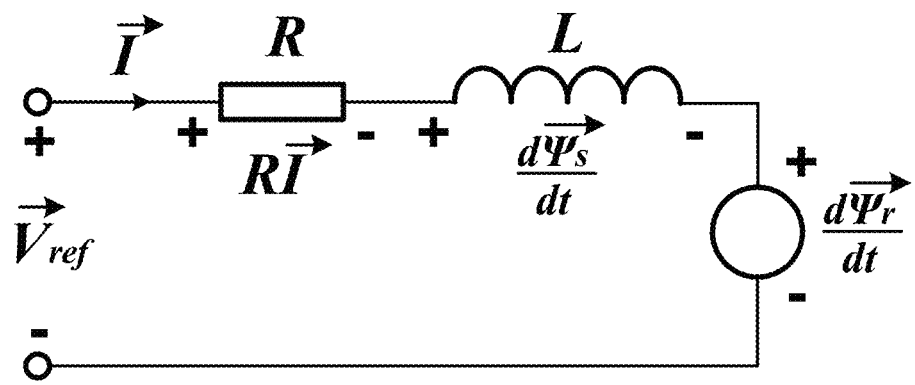
FIG. 4 illustrates an equivalent circuit of the electrical subsystem of a permanent magnet synchronous motor (PMSM), and one vector representation (phasor diagram) of the same.
Figure 4:
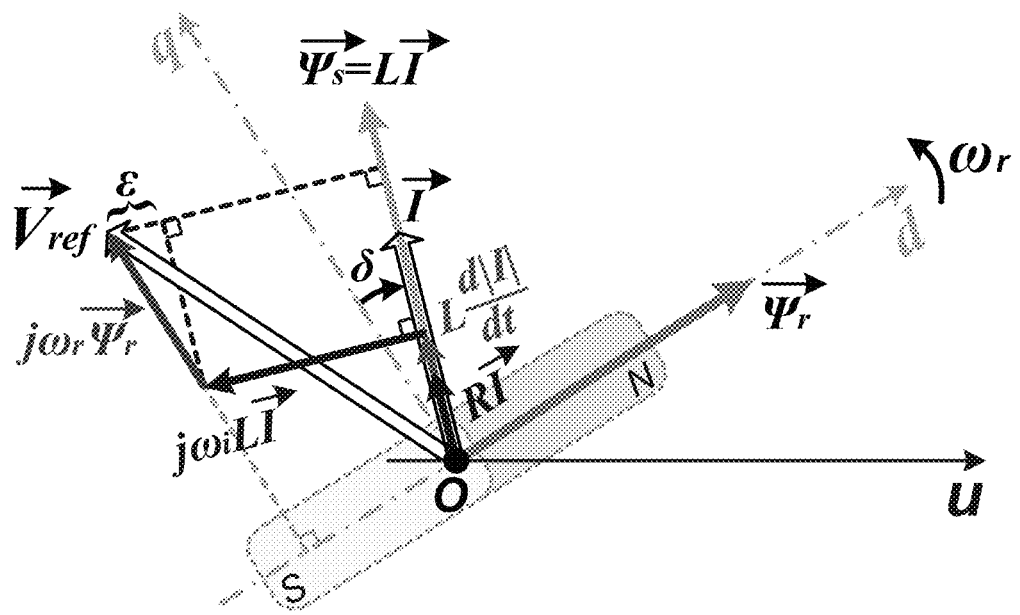
Figure 5:
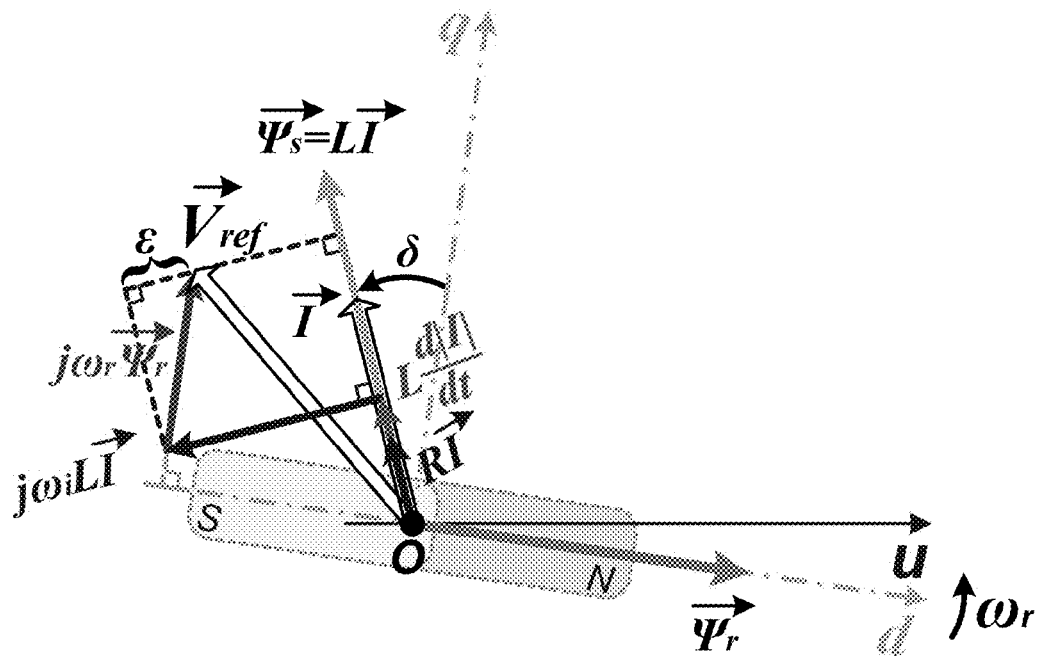
FIG. 5 includes two additional phasor diagrams of the equivalent circuit model of FIG. 4.
Figure 5:
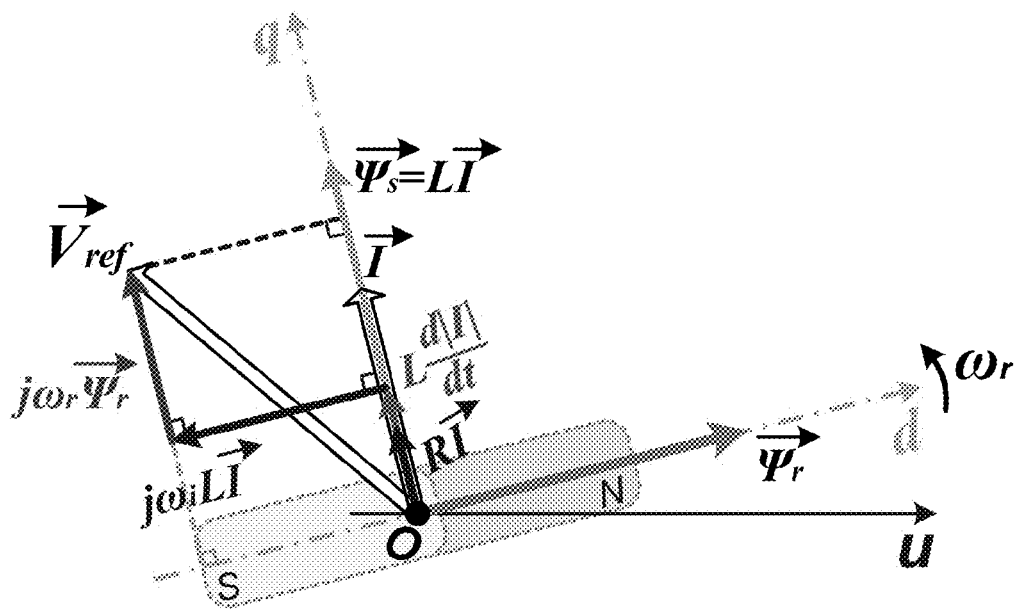

The phasor diagrams of Equation (6) are shown in FIGS. 4 and 5. To eliminate the motor 102 parameter of stator resistance R, all of the voltage space vectors in Equation (6) can be projected to the direction perpendicular to the current space vector. Accordingly, this yields:

$$|V_{ref}|\sin(\theta - \gamma) = \omega_i L|I| + \omega_r |\Psi_r|\sin\underbrace{\left(\frac{\pi}{2} + \varphi - \gamma\right)}_{-\delta} \quad (9)$$

Rearranging Equation (9) results in equation (10.a):

$$\epsilon = |V_{ref}|\sin(\gamma - \theta) + \omega_i L|I| = \omega_r |\Psi_r|\sin(\delta) \quad (10.a)$$

which may be scaled as shown in equation (10.b):

$$\frac{\epsilon}{L} = \frac{|V_{ref}|}{L}\sin(\gamma - \theta) + \omega_i |I| = \omega_r \frac{|\Psi_r|}{L}\sin(\delta) \quad (10.b)$$

where:

δ—Angle deviation of current space vector $\vec{I}$ from its desired position (i.e., along Oq direction, and perpendicular to the rotor flux);

$$\delta = \gamma - \varphi - \frac{\pi}{2}.$$

δ<0 if $\vec{I}$ is lagging Oq as shown in FIG. 4(b);

δ>0 if $\vec{I}$ is leading Oq as shown in FIG. 5(a);

δ=0 if $\vec{I}$ and Oq are in phase as shown in FIG. 5(b), which is the control target of FOC.

ε—A voltage difference resulted by non-zero δ, as shown in FIG. 4(b) and FIG. 5(a).

The sine function sin(δ), with δ in radians, can be represented by an infinite series as shown below:

$$\sin(\delta) = \sum_{n=0}^{\infty} \frac{(-1)^n}{(2n+1)!} \cdot \delta^{2n+1} \quad (11)$$

$$= \delta - \frac{1}{6}\delta^3 + \frac{1}{120}\delta^5 - \frac{1}{5040}\delta^7 + \ldots \text{ (for all } \delta\text{)}$$

Figure 6:
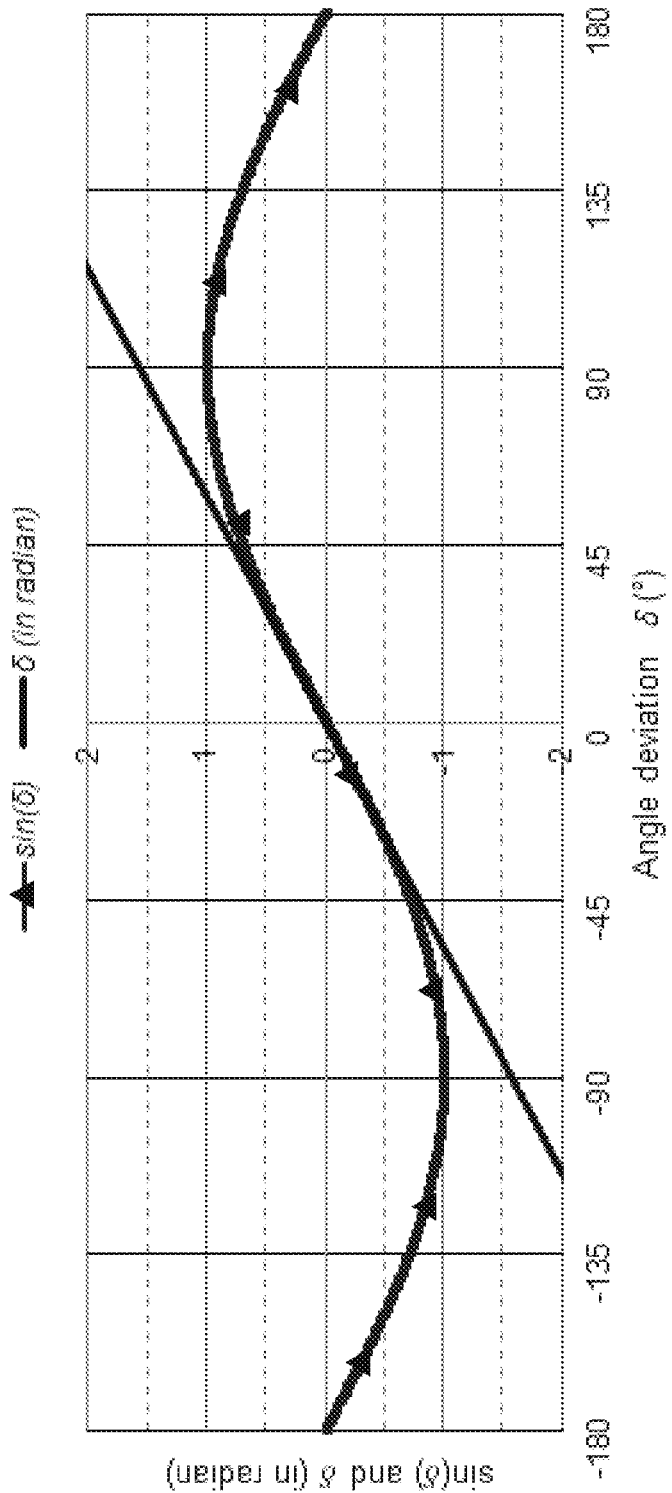
FIG. 6 is a plot of angle deviation (sine of deviation in degrees and deviation angle in radians) of a current space vector from its desired position.

FIG. 6 is a plot of sin(δ) and δ in radians verses angle deviation δ in degrees. When |δ|<<1 (e.g., |δ|<π/4), terms of higher order than the 2nd degree in the infinite series of Equation (11) can be omitted. Considering above and Equation (7), equations (10.a) and (10.b) become:

$$\epsilon = |V_{ref}|\sin(\gamma - \theta) + \omega L|I| \approx \omega_r |\Psi_r| \cdot \delta \quad (12.a)$$

and the scaled version:

$$\frac{\epsilon}{L} = \frac{|V_{ref}|}{L}\sin(\gamma - \theta) + \omega|I| \approx \omega_r \frac{|\Psi_r|}{L} \cdot \delta \quad (12.b)$$

It can be found from above, that in normal conditions:

1). The voltage difference ε will be 0 whenever the angle deviation δ is 0;

2). The voltage difference c is almost proportional to the current space vector angle deviation δ;

3). For the same non-zero angle deviation δ, the larger the BEMF magnitude $|\omega r \Psi r|$, the larger the resulting voltage difference ϵ magnitude. Hence, at higher motor speed, ϵ is more sensitive to non-zero δ.

Therefore, calculating the voltage difference $\epsilon=|V_{ref}|\sin(\gamma-\theta)+\omega L|I|$ can reveal whether the stator flux is perpendicular to the rotor flux as required for maximum energy efficiency. Additionally, the result can show how much angle deviation it is from the desired position, if it is not perpendicular.

In sensorless FOC arrangement 100 implementations, the voltage difference ϵ (or the scaled value $$\frac{\varepsilon}{L}\bigg)$$

can be used as a feedback signal to estimate the rotor position $\hat{\phi}$ and speed $\hat{\omega}$. Further, the feedback signal can be used to control the magnitude $|V_{ref}|$ of the revolving voltage space vector $\vec{V}_f$. As in examples shown in FIGS. 23, 24, and 26-31, the feedback can drive the angle deviation δ toward 0, tracking and/or optimizing the maximum motor driving efficiency. In various examples, the ϵ-δ relationship may not be linear if the angle deviation δ is too large, but it can still be determined what direction (i.e., leading or lagging) the angle is deviating, and push the angle deviation δ to move (e.g., in the opposite direction) toward 0.

Figure 7:
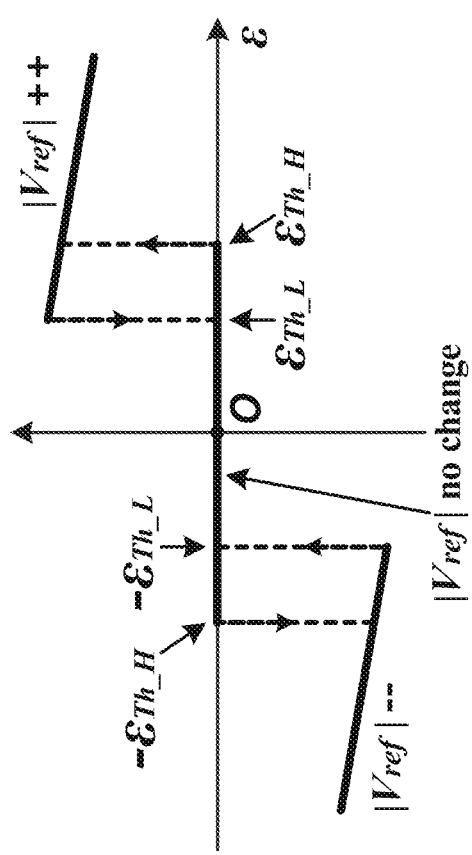
FIG. 7 is a block diagram of an example plot of the hysteresis of a motor controller, according to an implementation.

Referring to FIG. 7, hysteresis controllers (see FIGS. 28-31) are used for the control of reference vector magnitude $|V_{ref}|$ to avoid undesirable oscillations. The hysteresis of the controller (2802) is shown in FIG. 7, and its equations are:

$$|V_{ref}|[n] = \begin{cases} |V_{ref}|[n-1] - \Delta V & (\varepsilon > \varepsilon_{Th}) \\ |V_{ref}|[n-1] & (-\varepsilon_{Th} \le \varepsilon \le \varepsilon_{Th}) \\ |V_{ref}|[n-1] + \Delta V & (\varepsilon < -\varepsilon_{Th}) \end{cases} \quad (12.c)$$

$$\varepsilon_{Th} = \begin{cases} \varepsilon_{Th\_L} & (\text{if } |V_{ref}|[n] \ne |V_{ref}|[n-1]) \\ \varepsilon_{Th\_H} & (\text{if } |V_{ref}|[n] = |V_{ref}|[n-1]) \end{cases} \quad (12.d)$$

where:
$|V_{ref}|[n]$—Reference vector magnitude calculation result of current control cycle.
$|V_{ref}|[n-1]$—Reference vector magnitude calculation result of last control cycle.
ΔV—Change step of reference vector magnitude.
$\epsilon_{Th}$—Threshold of hysteresis controller.
$\epsilon_{Th\_L}$—Lower threshold of hysteresis controller. Initially set $\epsilon_{Th}$=Th_L
$\epsilon_{Th\_H}$—Higher threshold of hysteresis controller.

Note that the thresholds $\epsilon_{Th\_L}$ and $\epsilon_{Th\_H}$ are closely related to BEMF magnitude $|\omega r \Psi r|$, and thus, the rotor speed ωr. Usually the higher the motor 102 speed, the larger the threshold values for a specified motor 102.

Figure 8:
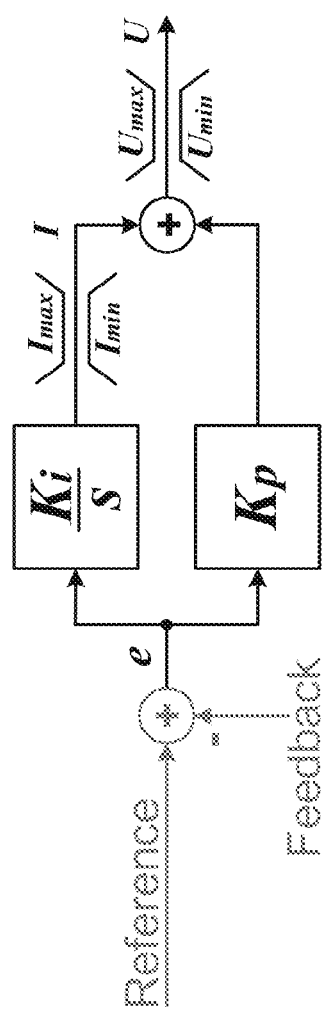
FIG. 8 is a block diagram of an example PI controller, according to an implementation.

PI controllers (e.g., 120, 122, and 130) as shown in FIG. 8, are used for the rotor speed control, stator magnetic flux magnitude control, and flux direction control. In some implementations, PI controllers are used for $I_d/I_q$ current control, as well as PLL rotor speed estimation (2306). In some examples, PI controllers are used to calculate change step ΔV of $|Vref|$ for the hysteresis controller (2802). A PI controller (e.g., 120, 122, and 130) is a special case of the PID controller in which the derivative of the error is not used. A PI controller (e.g., 120, 122, and 130) may be described by the equation:

$$U(t) = K_p e(t) + \underbrace{K_i \int_0^t e(\tau)d\tau}_{I(t)} \quad (13)$$

where:
e(t)—error signal, it is reference value minus feedback value.
$K_p$—Proportional gain.
$K_i$—Integral gain.
t—Instantaneous time.
τ—Variable of integration; takes on values from time 0 to the present time t.
I(t)—Integral term.
U(t)—PI controller output.

A digital implementation of the PI controller 120, 122, 130, 2306, and 2804 in a microcontroller can be expressed in the form:

$$I[k]=K_i e[k]+I[k-1] \quad (14)$$

$$U[k]=K_p e[k]+I[k] \quad (15)$$

Both I[k] and U[k] in Equations (14) and (15) have minimum and maximum limits to avoid the unwanted windup situation (anti-windup).

The low pass filter (LPF) 2304 in the PLL observer 2202 (See FIGS. 22-27) can be any order. For simplicity a first-order LPF with unity gain can be used, which may be expressed as:

$$y[k] = y[k-1] + \frac{1}{2^N}\{x[k] - y[k-1]\} \quad (16)$$

where:
y[k]—Current cycle filter output.
y[k-1]—Last cycle filter output.
x[k]—Current cycle filter input.
N—An integer which affects the LPF's cut-off frequency; N=1, 2, 3 . . . .

Figure 9:
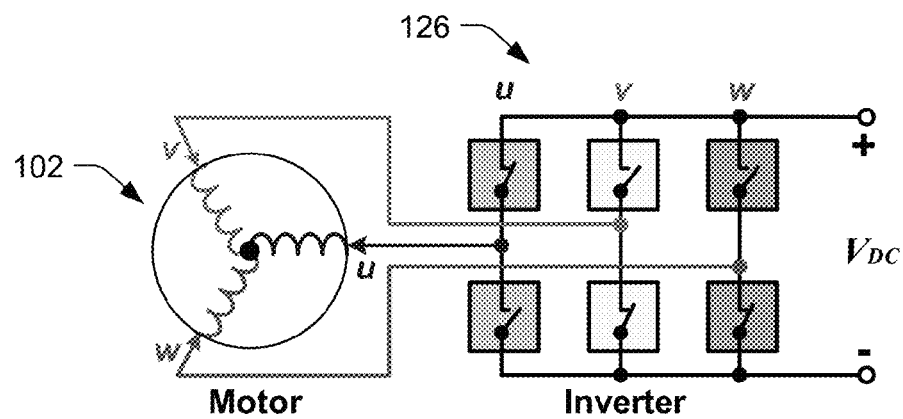
FIGS. 9 and 10 include a set of block diagrams of a 3-phase 2-level voltage source inverter, shown with different current sensing techniques, based on various implementations.
Figure 9:
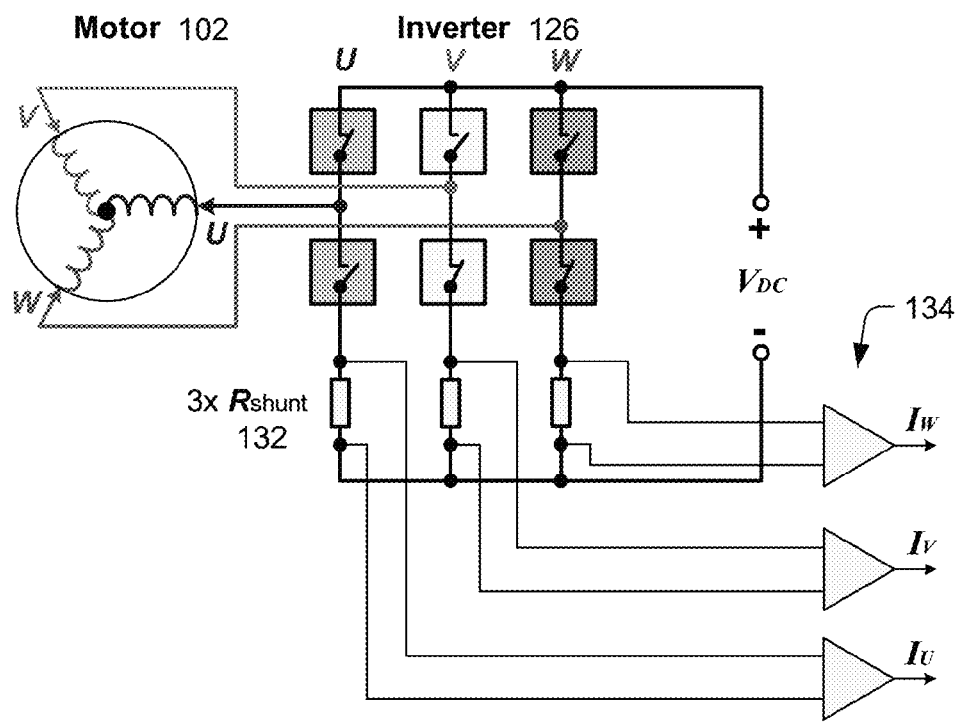
Figure 10:
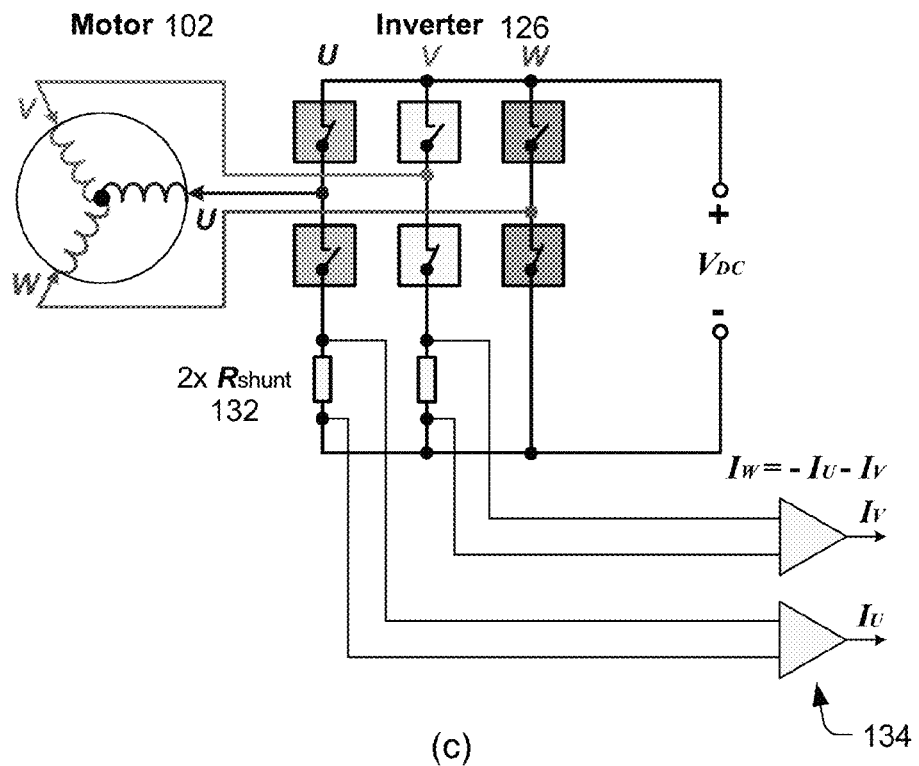
Figure 10:
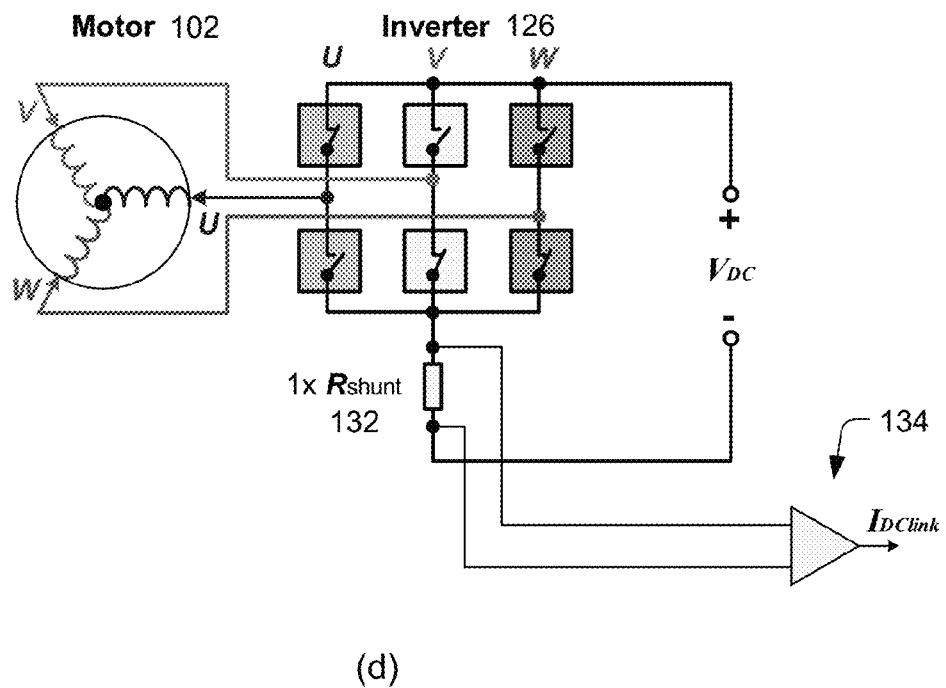

The connection of a 3-phase 2-level voltage source inverter 126 and a motor 102 are shown in FIGS. 9 and 10. The six switching devices of the inverter 126, which could be MOSFET, IGBT or similar parts, are controlled by microcontroller pulse-width modulated (PWM) signals. The motor 102 windings can be wired in star (as shown in FIG. 9(a)) or in delta formation.

Different motor 102 phase current sensing techniques can be used. In FIG. 9(b), three shunt resistors 132 are inserted to each leg of the inverter 126 to sense the current of each motor 102 phase. In FIG. 10(c), two shunt resistors 132 are inserted to two legs (e.g., phase U and V) of the inverter 126 to sense the current of two motor 102 phases. The third motor 102 phase current can be calculated easily because $I_U+I_V+I_W=0$. In FIG. 10(d), a single shunt resistor 132 is inserted into to the inverter 126 DC link to sense the DC link current, and 3-phase current reconstruction can be used to obtain the current information of motor 102 phases.

If desired, an amplifier 134, which can be external amplifier, on-chip ADC gain of the microcontroller, or similar, is used to amplify the resistor 132 voltage drop which is proportional to the current of motor 102 phase or DC link. Note that a Hall sensor, a current transformer, or other current sensors can replace the shunt resistor 132 for motor 102 phase current sensing.

Compared to triple-shunt and dual-shunt current sensing, single-shunt current sensing has the following important advantages:
1) Cost reduction as a result of one current sensor, one amplifier 134 (if any), and one ADC channel are used. Contrarily, triple-shunt and dual-shunt current sensing use multiple current sensors, amplifiers 134 (if any) and ADC channels.
2) No need to calibrate amplifier 134 gains and offsets (which may due to component tolerance, fluctuating temperature, aging, etc.) since the same current sensing circuit and ADC channel are used for all the current measurements of motor 102 phases.
3) Simpler and easier electronic schematics and PCB design.

Figure 11:
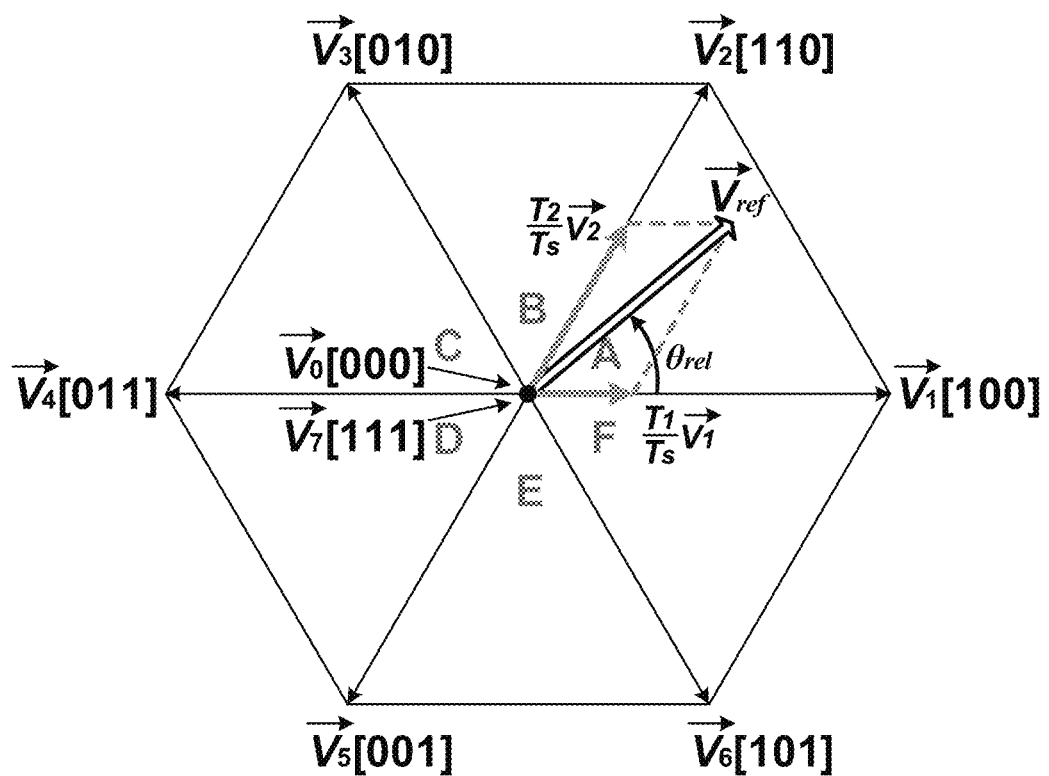
FIG. 11 is a space vector diagram and reference vector approximation of an example space vector modulator (SVM), according to an implementation.

Space Vector Modulation (SVM) is used to control the PWM for the inverter 126 switching devices in FIGS. 9 and 10, to create 3-phase sinusoidal waveforms to the motor 102 windings. The space vector diagram (a regular hexagon) and reference vector approximations of the SVM 124 are shown in FIG. 11. The plane is dissected in six sectors from A to F and the angle $\theta$ of the revolving reference vector $\vec{V}_{ref}=|V_{ref}| \cdot e^{j\theta}$ is transformed into the relative angle $\theta_{ref}$ in each sector. $\vec{V}_1$ to $\vec{V}_6$ are active vectors. $\vec{V}_0$ and $\vec{V}_7$ do not generate any voltage difference in the inverter outputs, and are zero vectors (or passive vectors). The reference vector $\vec{V}_{ref}$ is approximated by two adjacent active vectors (e.g., $\vec{V}_1$ and $\vec{V}_2$ when $\vec{V}_{ref}$ is in sector A) and one or both of the zero vectors (e.g., $\vec{V}_0$). $T_1$, $T_2$ and $T_0$ correspond with the active vectors and passive vector(s), respectively (e.g., $\vec{V}_1$, $\vec{V}_2$, and $\vec{V}_0$, in Sector A).

Referring to FIG. 11, and using reference vector in sector A as an example, the following portion shows the calculations of an SVM 124 arrangement. Using volt-second balancing:

$$\vec{V}_{ref} = \frac{T_0}{T_S}\vec{V}_{0/7} + \frac{T_1}{T_S}\vec{V}_1 + \frac{T_2}{T_S}\vec{V}_2 \quad (17)$$

$$T_S = T_0 + T_1 + T_2 \quad (18)$$

Equations (17) and (18) may be solved to yield:

$$T_1 = K_{SVM}\sin\left(\frac{\pi}{3} - \theta_{rel}\right) \cdot T_S \quad (19)$$
$$= \frac{1}{2} \cdot \left[\sqrt{3} \cdot K_{SVM}\cos(\theta_{rel}) - K_{SVM}\sin(\theta_{rel})\right] \cdot T_S$$

$$T_2 = K_{SVM}\sin(\theta_{rel}) \cdot T_S \quad (20)$$

$$T_0 = T_S - T_1 - T_2 \quad (21)$$

where:
$T_S$—Sampling period, e.g., $T_S$=50 μs.
$T_0$—Time of zero vector(s) is applied. The zero vector(s) can be $\vec{V}_0$[000], $\vec{V}_7$[111], or both.
$T_1$—Time of the $1^{st}$ active vector (e.g: $\vec{V}_1$ in sector A) is applied within one sampling period.
$T_2$—Time of the $2^{nd}$ active vector (e.g., $\vec{V}_2$ in sector A) is applied within one sampling period.

$$K_{SVM} - K_{SVM} = \sqrt{3} \cdot \frac{|V_{ref}|}{V_{DC}}.$$

$|V_{ref}|$ is the magnitude of $\vec{V}_{ref}$ and $V_{DC}$ is the inverter 126 DC link voltage.

In various implementations, the sine/cosine functions in Equations (19) and (20) can be calculated with different methods, (e.g. use a look-up table for sine function from 0 to 60° in microcontroller memory, etc.) or be calculated by a microcontroller, and so forth.

There are many SVM 124 schemes (e.g., symmetrical or asymmetrical 7-segment schemes, symmetrical or asymmetrical 5-segment scheme, and 3-segment scheme) that result in different quality and computational requirements. An SVM 124 scheme can be selected based on microcontroller features and application requirements, for example. In an implementation, a SVM 124 can be used for a sensorless FOC arrangement 100 with either triple-shunt or dual-shunt current sensing.

In an example, during V/f open-loop startup, the SVM 124 reference vector magnitude and angle are:

$$|V_{ref}|=\text{Offset}+K \cdot \omega_{ref} \quad (22)$$

$$\theta=\int \omega_{ref} dt \quad (23)$$

where:
Offset—A offset value for $|V_{ref}|$ at zero speed.
K—V/f constant.

The herein discussed sensorless FOC control techniques are well suited for some microcontrollers that have hardware coprocessors. For example, the coprocessor can compute trigonometric, linear, hyperbolic and related functions to offload the processor-intensive tasks from CPU and thus accelerate system performance. The table below gives examples of computations that could be used in the proposed control techniques.

| Coprocessor | | | |
|---|---|---|---|
| Operating Mode | Initial Data | Final Result Data [Note 1] | Calculation |
| Circular Vectoring Mode | X<br>Y<br>Z | $X_{final} = K\sqrt{X^2 + Y^2}$/MPS<br>$Y_{final} = 0$<br>$Z_{final} = Z + \arctan\left(\frac{Y}{X}\right)$<br><br>1). To solve the Cartesian to Polar Transform of current, set $X = I_\alpha$/K, $Y = I_\beta$/K, and $Z = 0$.<br>2). Specially, set $Z = -\theta$ to calculate Cartesian to Polar Transform of current and angle subtract $(\gamma - \theta)$ with one single calculation. | Cartesian to Polar Transform:<br>$|V_{ref}| = \sqrt{V_d^2 + V_q^2}$<br>$\Theta = \arctan\left(\frac{V_q}{V_d}\right)$<br>$|I| = \sqrt{I_\alpha^2 + I_\beta^2}$<br>$\gamma = \arctan\left(\frac{I_\beta}{I_\alpha}\right)$<br>Angle addition/subtraction:<br>$\theta = \Theta + \phi$<br>$\gamma - \theta$ |

| | | Coprocessor | |
|---|---|---|---|
| Operating Mode | Initial Data | Final Result Data [Note 1] | Calculation |
| Circular Rotation Mode | X Y Z | $X_{final} = K[X\cos(Z) - Y\sin(Z)]/MPS$<br>$Y_{final} = K[Y\cos(Z) + X\sin(Z)]/MPS$<br>$Z_{final} = 0$<br>1). To calculate $\|V_{ref}\|\sin(\gamma - \theta)$, set $X = \|V_{ref}\|/K$, $Y = 0$, $Z = \gamma - \theta$.<br>2). For SVM, first use one calculation to get $K_{SVM}\cos(\theta_{rel})$ and $K_{SVM}\sin(\theta_{rel})$, then use multiplication and subtraction of CPU to get $T_1$ and $T_2$. | Park Transform:<br>$I_d = I_\alpha\cos(\hat{\phi}) + I_\beta\sin(\hat{\phi})$<br>$I_q = -I_\alpha\sin(\hat{\phi}) + I_\beta\cos(\hat{\phi})$<br>Sine function:<br>$\|V_{ref}\|\sin(\gamma - \theta)$<br>SVM time:<br>$T_1 = \frac{1}{2} \cdot [\sqrt{3} \cdot K_{SVM}\cos(\theta_{rel}) - K_{SVM}\sin(\theta_{rel})] \cdot T_S$<br>$T_2 = K_{SVM}\sin(\theta_{rel}) \cdot T_S$ |

Example Angle Addition Technique for FOC Structures

Figure 12:
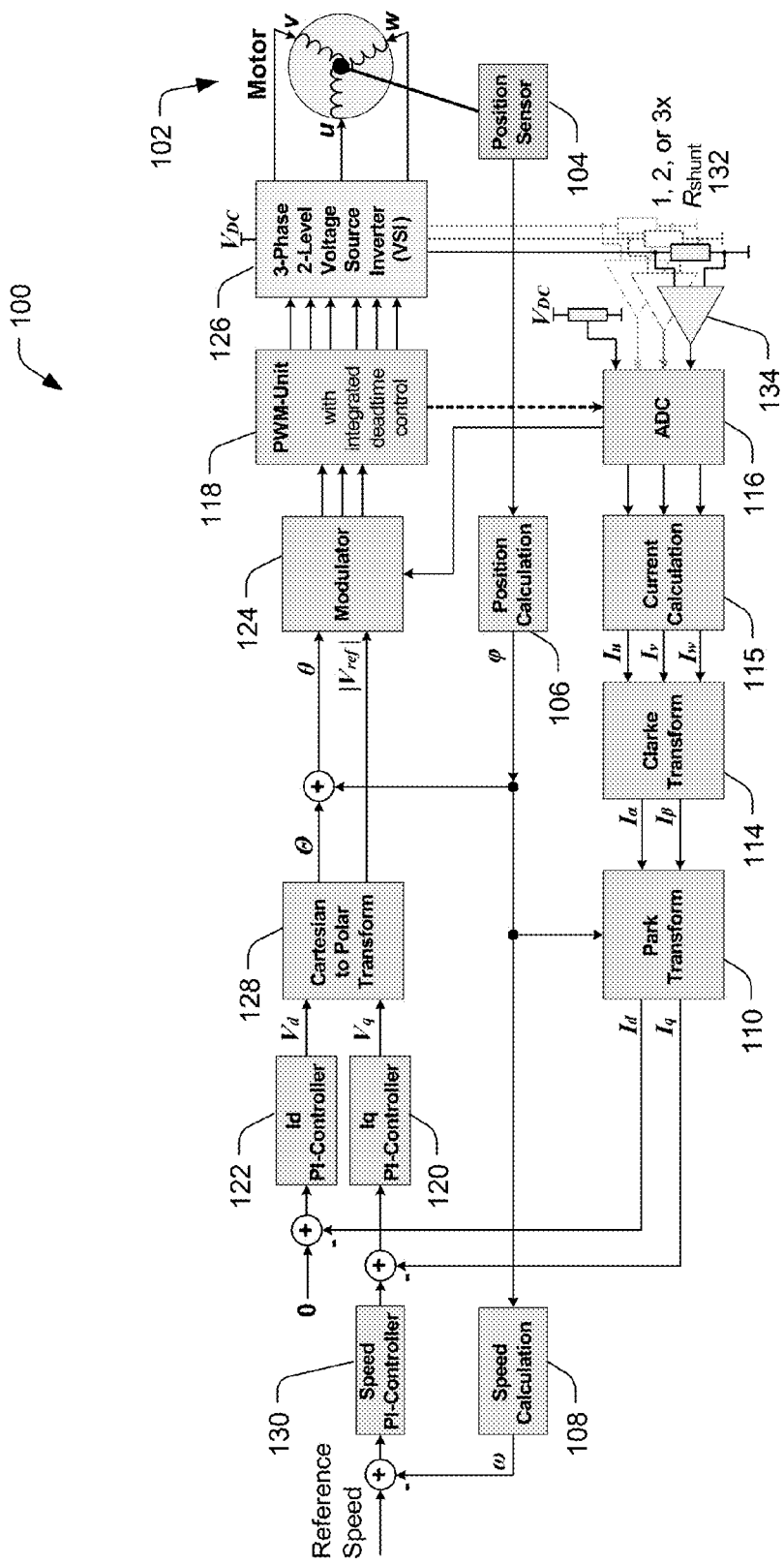
FIG. 12 is a block diagram of an example optimized sensored FOC arrangement, without Inverse Park Transform, according to an implementation.
Figure 13:
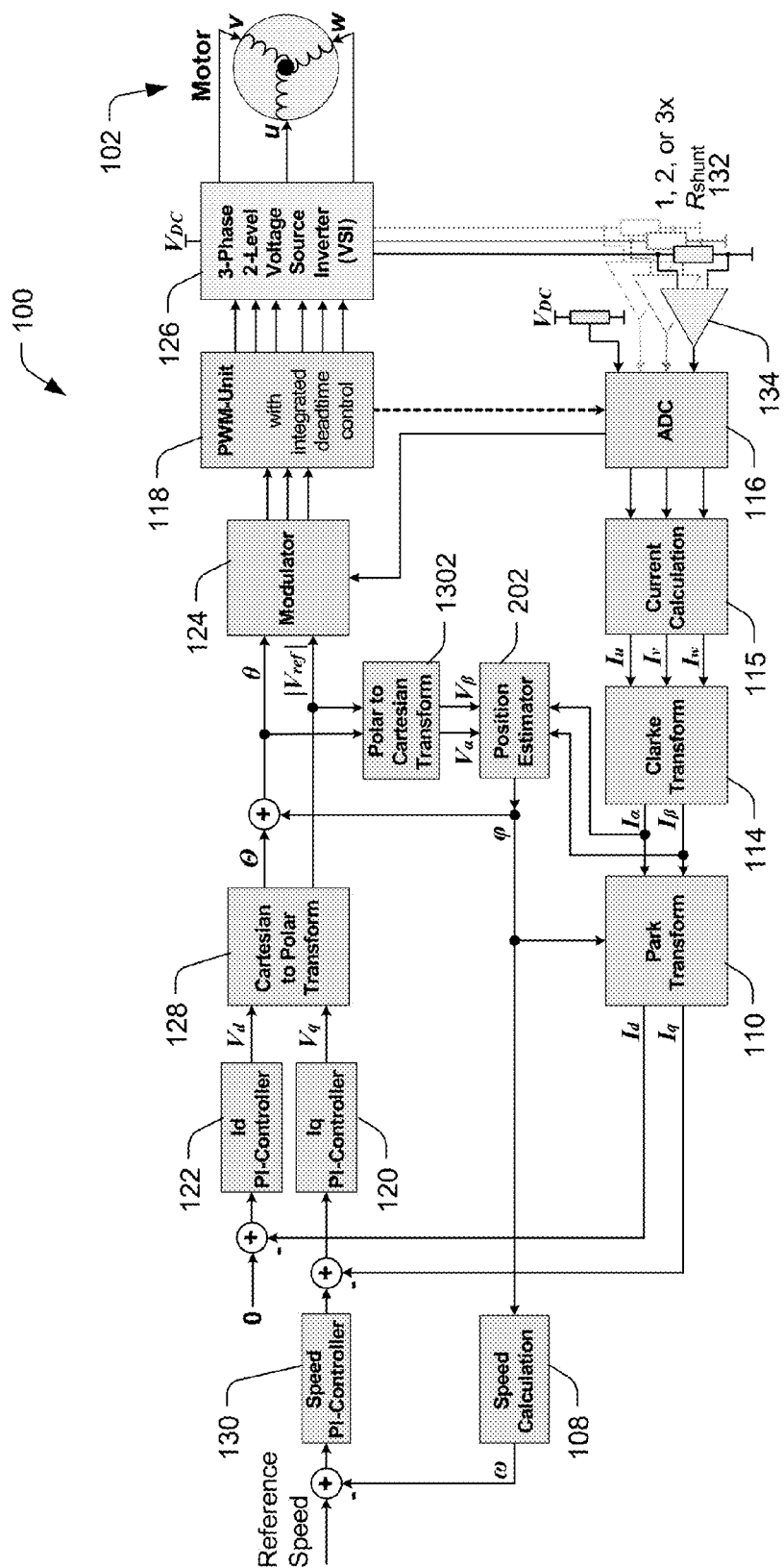
FIG. 13 is a block diagram of an example optimized sensorless FOC arrangement, without Inverse Park Transform, according to an implementation.

As shown in FIGS. 12 and 13, in various implementations, sensored (FIG. 12) and sensorless (FIG. 13) FOC structure arrangements 100, which can include method or process steps of operation, are operated without the computation-intensive Inverse Park Transform 112. For example, in some implementations, as in the implementations of FIGS. 12 and 13, a FOC structure arrangement 100 uses magnitude and angle to represent the voltage space vector in polar coordinate systems. In the implementations, the Inverse Park Transform 112, with sine and cosine functions, which are used in some FOC arrangements 100 (see FIGS. 1 and 2), can be replaced by addition of angles, while keeping the voltage space vector magnitude |Vref| unchanged.

In an example, the addition of angles can be computed precisely and instantly (e.g., angle addition operations can be done within one, or a few system clocks with most microcontrollers). This is illustrated in the table below, which shows the angle addition techniques used for the FOC arrangements 100 of FIGS. 12 and 13.

| Transformation | FOC 100 of FIGS. 1 and 2 | FOC 100 of FIGS. 12 and 13 |
|---|---|---|
| uvw to α-β Transform | Clarke Transform 114:<br>$I_\alpha = I_u$<br>$I_\beta = (I_u + 2I_v)/\sqrt{3}$<br>$(I_u + I_v + I_w = 0)$<br>In matrix form:<br>$\begin{bmatrix} I_\alpha \\ I_\beta \end{bmatrix} = \begin{bmatrix} 1 & 0 \\ 1/\sqrt{3} & 2/\sqrt{3} \end{bmatrix} \begin{bmatrix} I_u \\ I_v \end{bmatrix}$ | Same as FOC arrangement 100 of FIGS. 1 and 2 |
| Stationary coordinate system to rotating coordinate system Transform | Park Transform 110:<br>$I_d = I_\alpha\cos(\phi) + I_\beta\sin(\phi)$<br>$I_q = -I_\alpha\sin(\phi) + I_\beta\cos(\phi)$<br>In matrix form:<br>$\begin{bmatrix} I_d \\ I_q \end{bmatrix} = \begin{bmatrix} \cos(\varphi) & \sin(\varphi) \\ -\sin(\varphi) & \cos(\varphi) \end{bmatrix} \begin{bmatrix} I_\alpha \\ I_\beta \end{bmatrix}$ | Same as FOC arrangement 100 of FIGS. 1 and 2 |
| Rotating coordinate system to stationary coordinate system Transform | Inverse Park Transform 112:<br>$V_\alpha = V_d\cos(\phi) - V_q\sin(\phi)$<br>$V_\beta = V_d\sin(\phi) + V_q\cos(\phi)$<br>In matrix form:<br>$\begin{bmatrix} V_\alpha \\ V_\beta \end{bmatrix} = \begin{bmatrix} \cos(\varphi) & -\sin(\varphi) \\ \sin(\varphi) & \cos(\varphi) \end{bmatrix} \begin{bmatrix} V_d \\ V_q \end{bmatrix}$ | Addition of angles:<br>$\theta = \Theta + \phi \ (\pm 2n\pi)$<br>where $\theta = \arctan\left(\frac{V_\beta}{V_\alpha}\right)$<br>$\Theta = \arctan\left(\frac{V_q}{V_d}\right)$<br>$\phi$—Rotor position/angle<br>$n = 0, \pm 1, \pm 2, \pm 3,$ or ... *<br>Magnitude maintains, i.e.,<br>$\|V_{ref}\| = \sqrt{V_\alpha^2 + V_\beta^2} = \sqrt{V_d^2 + V_q^2}$ |
| Cartesian to Polar Transform | $\|V_{ref}\| = \sqrt{V_\alpha^2 + V_\beta^2}$<br>$\theta = \arctan\left(\frac{V_\beta}{V_\alpha}\right)$ | $\|V_{ref}\| = \sqrt{V_d^2 + V_q^2}$<br>$\Theta = \arctan\left(\frac{V_q}{V_d}\right)$ |
| Polar to Cartesian Transform | Not used | For sensorless FOC:<br>$V_\alpha = \|V_{ref}\|\cos(\theta)$<br>$V_\beta = \|V_{ref}\|\sin(\theta)$ |

Note *:
Mathematically $n$ can be any integer. Usually select one $n$ (e.g., $n = 0$).

Accordingly, in an implementation, the Inverse Park Transform 112 is bypassed in a FOC arrangement 100, as shown in FIGS. 12 and 13. Instead, the angles Φ and φ are added to produce θ, where $$\Theta = \arctan\left(\frac{V_q}{V_d}\right)$$

and φ is the rotor position/angle. In one example, the magnitude of the voltage space vector $|V_{ref}|$ is calculated with $V_d$ and $V_q$, as shown in the table above. This represents a manipulation of the voltage space vector in a polar coordinate system, as also shown.

For example, as shown in FIG. 13, in a sensorless FOC arrangement 100, a Polar to Cartesian Transform 1302 may be used in the slow control loop to generate Vα and Vβ for the position estimator 202, using $|V_{ref}|$ and θ as inputs.

In various implementations, calculations executed for the various modules of the FOC arrangement 100 may be performed on a computing device (e.g., microprocessor, microcontroller, CPU, etc.), they may be accessed via a look-up table, or a combination of both. For example, the look-up table may be stored in a local or remote memory device, or the like, and may be accessed by a computing device.

Figure 14:
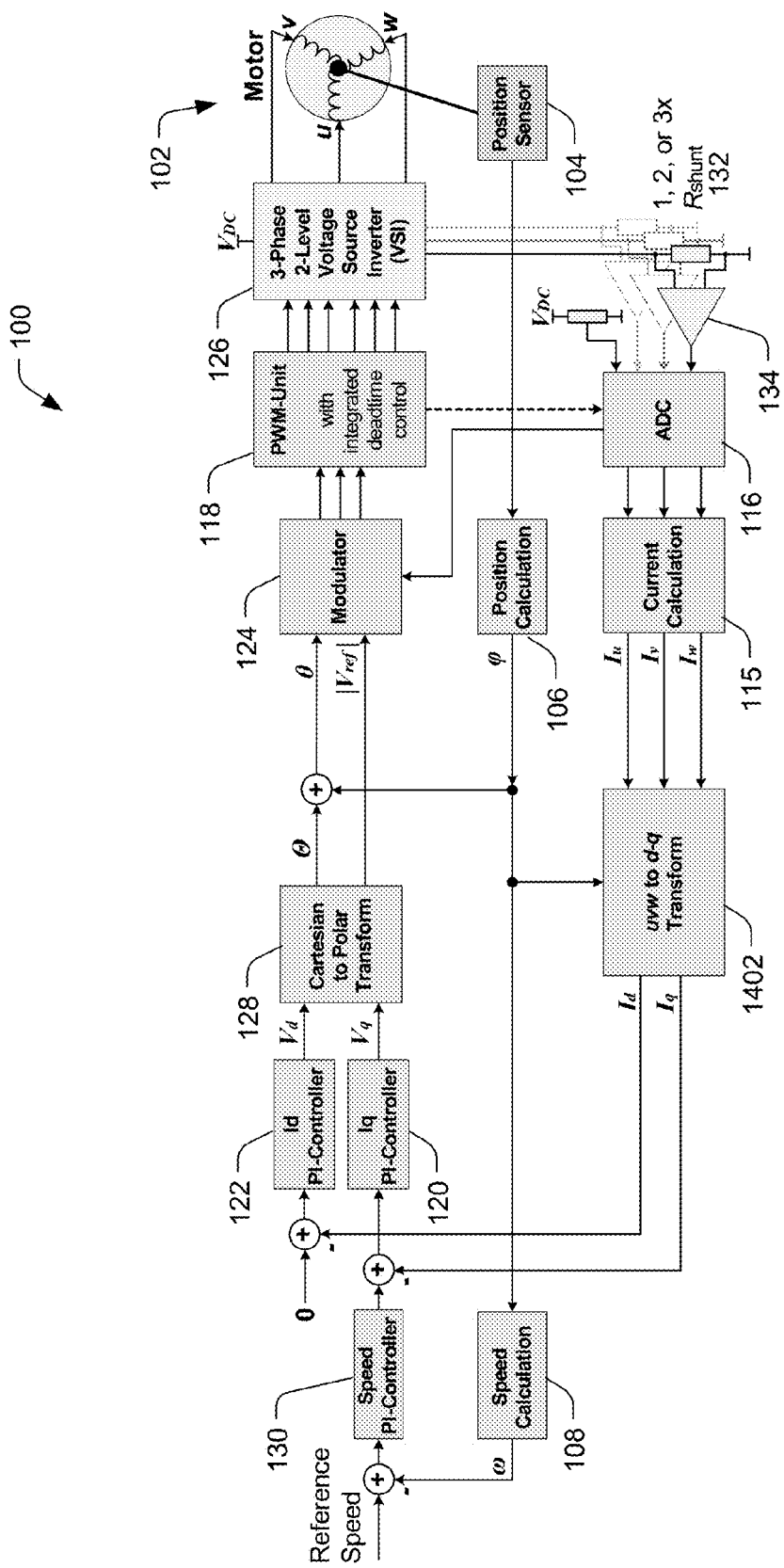
FIG. 14 is a block diagram of an alternate example optimized sensored FOC arrangement, without Inverse Park Transform and Clarke Transform, according to another implementation.

In an alternate implementation, as shown in FIG. 14, a sensored FOC arrangement 100 can also bypass the Park Transform 110 and the Clarke Transform 114. In the implementation, the current variables Iα and β are inessential, and current variables $I_d$ and $I_q$ may be output from a uvw to d-q Transform 1402.

For example, the mathematical expressions from the Park Transform 110 and the Clark Transform 114 may be combined in matrix form to yield:

$$\begin{bmatrix} I_d \\ I_q \end{bmatrix} = \begin{bmatrix} \cos(\varphi) & \sin(\varphi) \\ -\sin(\varphi) & \cos(\varphi) \end{bmatrix} \begin{bmatrix} 1 & 0 \\ 1/\sqrt{3} & 2/\sqrt{3} \end{bmatrix} \begin{bmatrix} I_u \\ I_v \end{bmatrix} \quad (24)$$

These can be simplified to form the uvw to d-q Transform 1402 as shown below:

$$\begin{bmatrix} I_d \\ I_q \end{bmatrix} = K_1 \begin{bmatrix} \cos\left(\varphi - \frac{\pi}{6}\right) & \sin(\varphi) \\ -\sin\left(\varphi - \frac{\pi}{6}\right) & \cos(\varphi) \end{bmatrix} \begin{bmatrix} I_u \\ I_v \end{bmatrix} \quad (25)$$

or $$\begin{bmatrix} I_d \\ I_q \end{bmatrix} = K_1 \begin{bmatrix} \sin\left(\varphi + \frac{\pi}{3}\right) & \sin(\varphi) \\ \cos\left(\varphi + \frac{\pi}{3}\right) & \cos(\varphi) \end{bmatrix} \begin{bmatrix} I_u \\ I_v \end{bmatrix} \quad (26)$$

where: $K_1$ is a scaling factor;

$$K_1 = \frac{2}{\sqrt{3}},$$

which can be neglected (i.e., make $K_1=1$). In an example, the scaling factor $$\frac{2}{\sqrt{3}}$$

can be combined with other scaling factors of the FOC control strategy (e.g., current sensing and amplification, analog-to-digital conversion, etc.). In an implementation, a look-up table is used for sine functions, for example, to optimize control loop speed.

Figure 15:
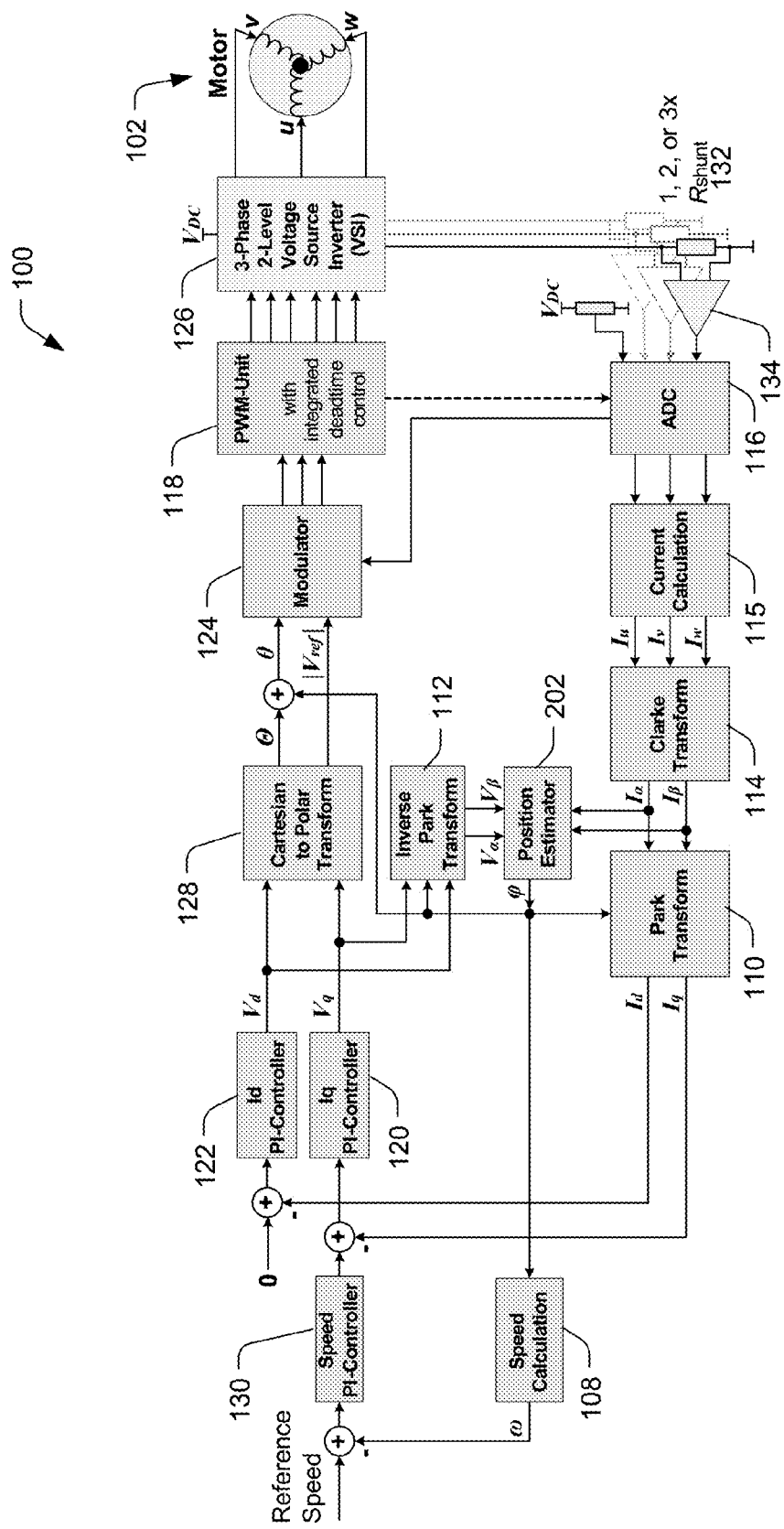
FIG. 15 is a block diagram of an alternate example optimized sensorless FOC arrangement, without Inverse Park Transform in the fast current control loop, according to another implementation.

In another alternate implementation, as shown in FIG. 15, the Inverse Park Transform 112 may be moved to the slow control loop, instead of being bypassed, or operating in the fast control loop. In one example, the voltages $V_\alpha$ and $V_\beta$ can be calculated from $V_d$ and $V_q$ using an Inverse Park Transform 112, but the Inverse Park Transform 112 may be a part of the slow control loop for rotor position estimation (e.g., at 202), as shown in the FOC arrangement 100 of FIG. 15.

In an implementation, this alternate FOC control strategy has improved fast control loop efficiency compared to the FOC arrangement of FIG. 2. To further increase the calculation speed, the Inverse Park Transform 112 can be calculated by a coprocessor of a microcontroller at the same time that the microcontroller is computing for the SVM modulator 124, or other module, for instance.

Example Stator Flux Magnitude and Direction Technique for FOC Structures

Figure 16:
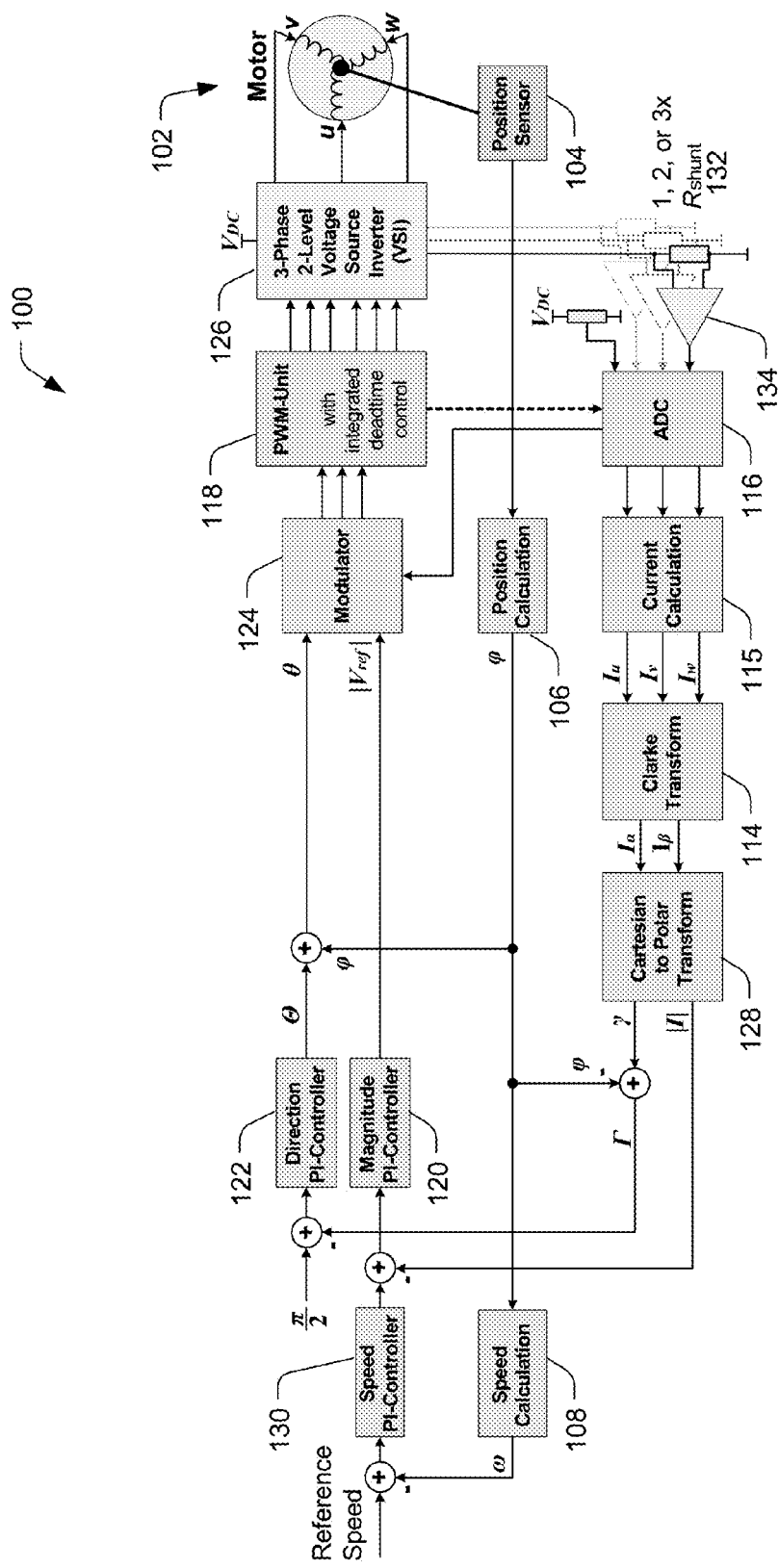
FIG. 16 is a block diagram of an example optimized sensored FOC arrangement, without Park Transform and Inverse Park Transform, according to an implementation.
Figure 17:
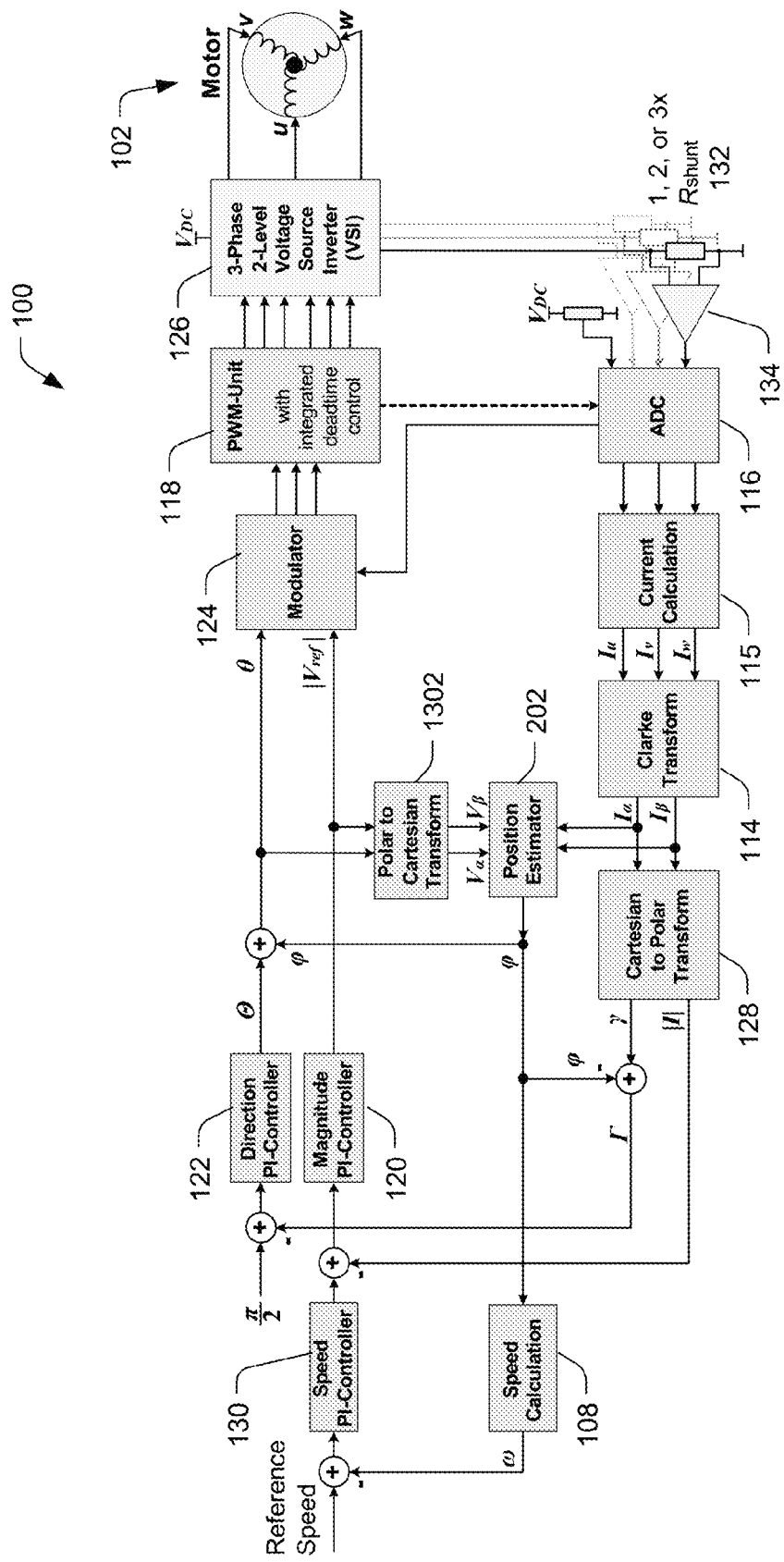
FIG. 17 is a block diagram of an example optimized sensorless FOC arrangement, without Park Transform and Inverse Park Transform, according to an implementation.

As shown in FIGS. 16 and 17, in various implementations, sensored (FIG. 16) and sensorless (FIG. 17) FOC structure arrangements 100, which can include method or process steps of operation, are operated without the computation-intensive Park Transform 110 and Inverse Park Transform 112. For example, in some implementations, as in the implementations of FIGS. 16 and 17, a FOC structure arrangement 100 includes stator flux magnitude and direction control strategies. For example, the FOC arrangement 100 of FIGS. 16 and 17 use stator magnetic flux (or current space vector) magnitude and angle control, including angle subtraction or addition to replace complex Park Transform 110 and/or Inverse Park Transform 112.

In various implementations, the control strategies use polar coordinates instead of Cartesian coordinates to represent motor space vectors, so that the complex Cartesian reference frame transformations (e.g., Park Transform 110 and Inverse Park Transform 112 with sine and cosine functions, which are used in FOC arrangements 100 of FIGS. 1 and 2) can be replaced by subtraction and addition of angles, while keeping space vector magnitudes unchanged.

In an example, the subtraction and addition of angles can be computed precisely and instantly (addition or subtraction operations can be done within one, or a few system clocks with many microcontrollers). This is illustrated in the table below, which shows the angle subtraction and addition techniques used for the FOC arrangements 100 of FIGS. 16 and 17.

| Transformation | FOC 100 of FIGS. 1 and 2 | FOC 100 of FIGS. 16 and 17 |
|---|---|---|
| uvw to α-β Transform | Clarke Transform 114:<br>$I_\alpha = I_u$<br>$I_\beta = (I_u + 2I_v)/\sqrt{3}$<br>$(I_u + I_v + I_w = 0)$<br>In matrix form:<br>$$\begin{bmatrix} I_\alpha \\ I_\beta \end{bmatrix} = \begin{bmatrix} 1 & 0 \\ 1/\sqrt{3} & 2/\sqrt{3} \end{bmatrix} \begin{bmatrix} I_u \\ I_v \end{bmatrix}$$ | Same as FOC arrangement 100 of FIGS. 1 and 2 |
| Stationary coordinate system to rotating coordinate system Transform | Park Transform 110:<br>$I_d = I_\alpha \cos(\phi) + I_\beta \sin(\phi)$<br>$I_q = -I_\alpha \sin(\phi) + I_\beta \cos(\phi)$<br>In matrix form:<br>$$\begin{bmatrix} I_d \\ I_q \end{bmatrix} = \begin{bmatrix} \cos(\varphi) & \sin(\varphi) \\ -\sin(\varphi) & \cos(\varphi) \end{bmatrix} \begin{bmatrix} I_\alpha \\ I_\beta \end{bmatrix}$$ | Subtraction of angles:<br>$\Gamma = \gamma - \phi \ (\pm 2m\pi)$<br>where $\Gamma = \arctan\left(\frac{I_q}{I_d}\right)$<br>$\gamma = \arctan\left(\frac{I_\beta}{I_\alpha}\right)$<br>φ—Rotor position/angle<br>$m = 0, \pm 1, \pm 2, \pm 3, \text{ or } \ldots$ *<br>Magnitude maintains, i.e.,<br>$|I| = \sqrt{I_d^2 + I_q^2} = \sqrt{I_\alpha^2 + I_\beta^2}$ |
| Rotating coordinate system to stationary coordinate system Transform | Inverse Park Transform 112:<br>$V_\alpha = V_d \cos(\phi) - V_q \sin(\phi)$<br>$V_\beta = V_d \sin(\phi) + V_q \cos(\phi)$<br>In matrix form:<br>$$\begin{bmatrix} V_\alpha \\ V_\beta \end{bmatrix} = \begin{bmatrix} \cos(\varphi) & -\sin(\varphi) \\ \sin(\varphi) & \cos(\varphi) \end{bmatrix} \begin{bmatrix} V_d \\ V_q \end{bmatrix}$$ | Addition of angles:<br>$\theta = \Theta + \phi \ (\pm 2n\pi)$<br>where $\theta = \arctan\left(\frac{V_\beta}{V_\alpha}\right)$<br>$\Theta = \arctan\left(\frac{V_q}{V_d}\right)$<br>φ—Rotor position/angle<br>$n = 0, \pm 1, \pm 2, \pm 3, \text{ or } \ldots$ **<br>Magnitude maintains, i.e.,<br>$|V_{ref}| = \sqrt{V_\alpha^2 + V_\beta^2} = \sqrt{V_d^2 + V_q^2}$ |
| Cartesian to Polar Transform | $|V_{ref}| = \sqrt{V_\alpha^2 + V_\beta^2}$<br>$\theta = \arctan\left(\frac{V_\beta}{V_\alpha}\right)$ | $|I| = \sqrt{I_\alpha^2 + I_\beta^2}$<br>$\gamma = \arctan\left(\frac{I_\beta}{I_\alpha}\right)$ |
| Polar to Cartesian Transform | Not used | For sensorless new strategies:<br>$V_\alpha = |V_{ref}|\cos(\theta)$<br>$V_\beta = |V_{ref}|\sin(\theta)$ |

Note *:
Mathematically $m$ can be any integers. Usually select one $m$ so that $\Gamma$ is near to $\pi/2$.
Note **:
Mathematically $n$ can be any integers. Usually select one $n$ (e.g., $n = 0$)

Accordingly, in an implementation, the Park Transform 110 and Inverse Park Transform 112 are bypassed in a FOC arrangement 100, as shown in FIGS. 16 and 17. Instead, the angles γ–φ are subtracted to produce Γ, where $$\gamma = \arctan\left(\frac{I_\beta}{I_\alpha}\right)$$

and φ is the rotor position/angle, and the angles Φ and φ are added to produce θ, where $$\Theta = \arctan\left(\frac{V_q}{V_d}\right)$$

and φ is the rotor position/angle. In one example, the magnitude of the voltage space vector $|V_{ref}|$ is calculated with $V_d$ and $V_q$, as shown in the table above. This represents a manipulation of the voltage space vector in a polar coordinate system, as also shown.

For example, in steady state, the magnitudes of the PMSM motor space vectors (i.e., current space vector, stator and rotor magnetic flux space vectors, and voltage space vector) are constants, while their directions are stationary in the rotating polar coordinate system which is fixed to the rotor. So it is possible to use PID controllers to control the stator flux magnitude and direction to achieve constant speed and controlled torque for quiet motor operation, and also control the stator flux to be perpendicular to the rotor flux for maximum energy efficiency. With polar coordinate systems the reference frame transformations for motor control can be done by subtraction or addition of angles, so computation-friendly motor control with fast control loop are achieved.

In various implementations, as shown in FIGS. 16 and 17, after ADC 116 conversions and Clarke Transform 114 to get currents $I_\alpha$ and $I_\beta$, a Cartesian to Polar Transform 128 is used to get the magnitude |I| and direction (e.g., angle) γ of the current space vector. Instead of using complex Park Transform 110, subtractions of angles Γ=γ–φ achieve the transformation from the stationary coordinate system to the rotating coordinate system. To obtain maximum torque and power efficiency, magnitude and direction PI controllers 120, 122 are used to control the magnitude and direction of voltage space vector, respectively, to make the stator flux space vector perpendicular to the rotor magnetic field, (i.e., forcing Γ to be π/2 (or –π/2)). In the implementations, it is also possible to control Γ between π and π/2 to decrease the magnetic flux of the motor air gap (i.e., flux-weakening control) to extend the operating speed range of the motor 102.

An addition of angles θ=Φ+φ accomplishes the transformation from the rotating coordinate system to the stationary coordinate system, in place of Inverse Park Transform 112 of FOC arrangements of FIGS. 1 and 2. The magnitude |V$_{ref}$| and angle θ of the voltage space vector, together with the inverter 126 DC link voltage information, are sent to SVM 124 to control the inverter 126 output for the motor 102.

The speed PI controller 130 output is the reference for the magnitude PI controller 120. As described above, the rotor position (at 106) and speed calculation (at 108), speed PI control 130 are the slow control loop of the FOC arrangement 100. In some sensorless implementations, as shown in FIG. 17, a Polar to Cartesian Transform 1302 is used in the slow control loop to generate V$_α$ and V$_β$ for the position estimator 202. The other computing blocks of the FOC arrangements 100, as shown in FIGS. 16 and 17 are the fast stator flux control loop.

Without Park Transform 110 and Inverse Park Transform 112 which are used with the FOC arrangements of FIGS. 1 and 2, the fast control loop becomes much simpler and faster. For example, fewer and simpler calculations also mean less accumulative calculation errors, especially for low-end microcontrollers.

To provide the highest performance for both sensored and sensorless control strategies as shown in FIGS. 16 and 17, two calculations: 1) Cartesian to Polar Transform to get magnitude |I| and angle γ, and 2) subtraction of angles Γ=γ−φ, can be computed with one calculation when using some microcontrollers with a coprocessor. In other words, both calculations can consume very little CPU time. For a sensorless control strategy as shown in FIG. 17, the Polar to Cartesian Transform 1302 to get V$_α$ and V$_β$ can be computed simultaneously by the coprocessor of a microcontroller while the CPU is computing for the SVM modulator 124, or the like. Additionally, a look-up table of sine function from 0 to 90° can be used and can be re-used by the SVM modulator 124, or others, to maximize memory usage.

Figure 18:
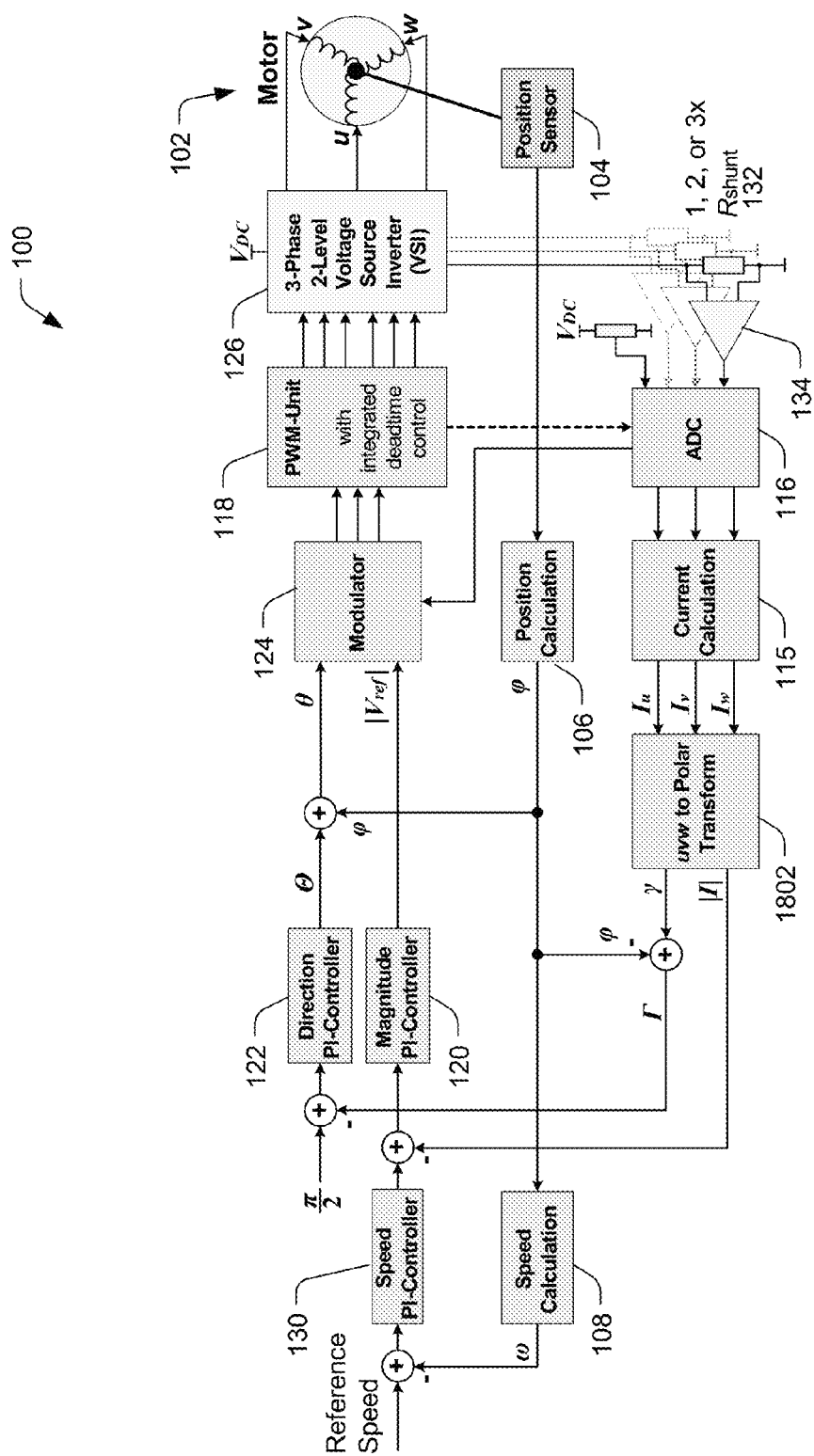
FIG. 18 is a block diagram of an alternate example optimized sensored FOC arrangement, without Park Transform and Inverse Park Transform, according to another implementation.
Figure 19:
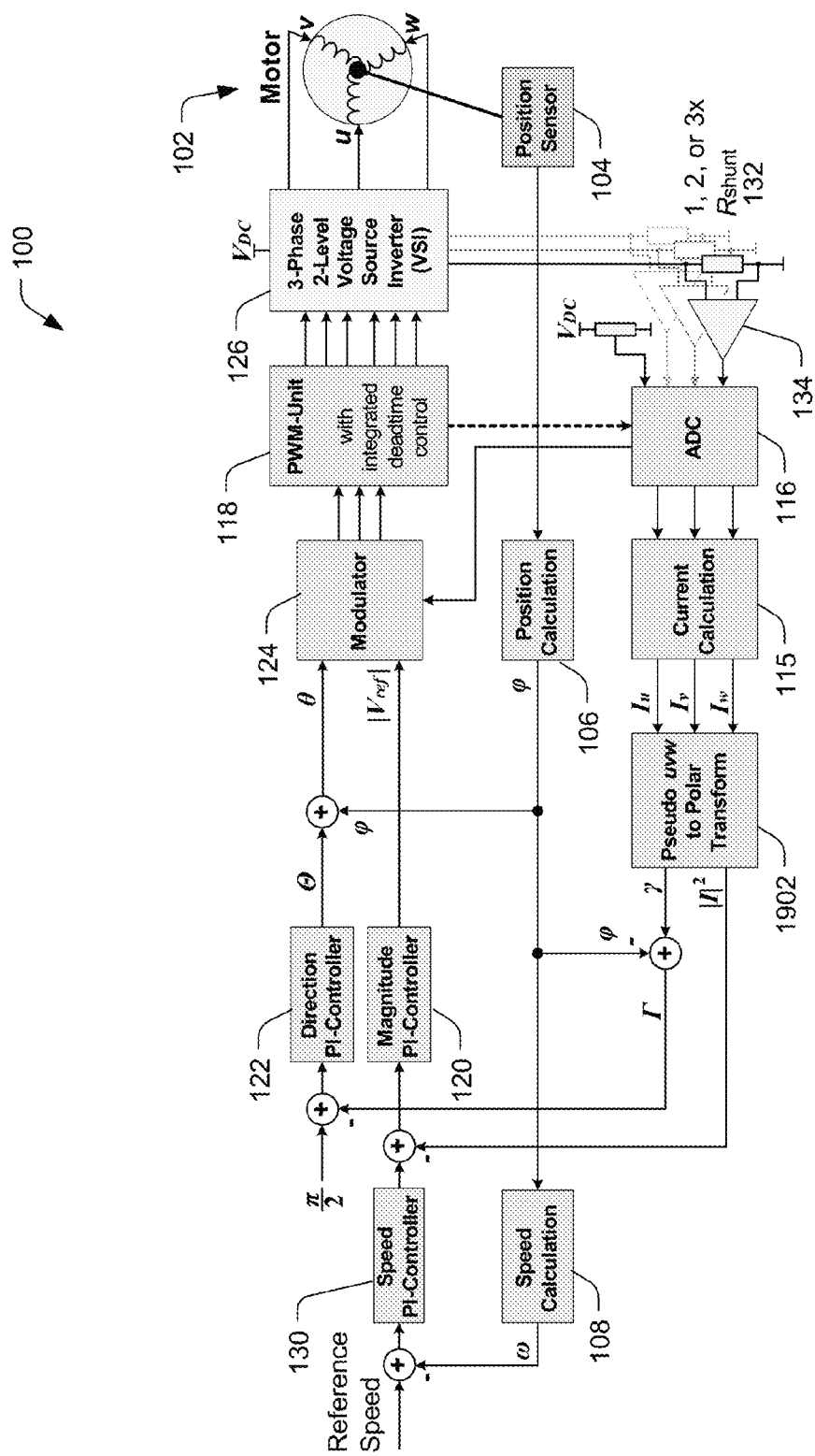
FIG. 19 is a block diagram of a further alternate example optimized sensored FOC arrangement, without Park Transform and Inverse Park Transform, according to a further implementation.

In various implementations, several varieties of stator flux magnitude and direction control strategies may be implemented. FIGS. 18 and 19 show two alternative strategies for sensored FOC arrangements 100. For example, a sensored stator flux magnitude and direction control strategy (i.e., FOC arrangement 100) with a direct uvw to Polar Transform 1802 (i.e., without Clarke Transform 114) is shown in FIG. 18. For instance, the arrangement 100 shown in FIG. 18 uses a uvw to Polar Transform 1802, as described by the equations below:

$$|I| = K_1\sqrt{I_u^2 + I_v^2 + I_u I_v} \quad (27)$$

$$\gamma = \arctan\left(\frac{I_u + 2I_v}{\sqrt{3} \cdot I_u}\right) \quad (28)$$

where: K$_1$ is a scaling factor;

$$K_1 = \frac{2}{\sqrt{3}},$$

which can be neglected (i.e., make K$_1$=1). In an example, the scaling factor $$\frac{2}{\sqrt{3}}$$

can be combined with other scaling factors of the FOC control strategy (e.g., current sensing and amplification, analog-to-digital conversion, etc.).

In an implementation, varieties of alternate control strategies are combined to form the FOC arrangement 100 shown in FIG. 19. For example, in a case where the chosen microcontroller is better suited to computing squares than a square root function, it is possible to use |I|$^2$ instead of |I| as the feedback of the magnitude PI controller 120. In such a case, a pseudo uvw to Polar Transform 1902 may be used as shown in FIG. 19, and described by the equations below:

$$|I|^2 = I_u^2 + I_v^2 + I_u I_v \quad (29)$$

$$\gamma = \arctan\left(\frac{I_u + 2I_v}{\sqrt{3} \cdot I_u}\right) \quad (30)$$

Figure 20:
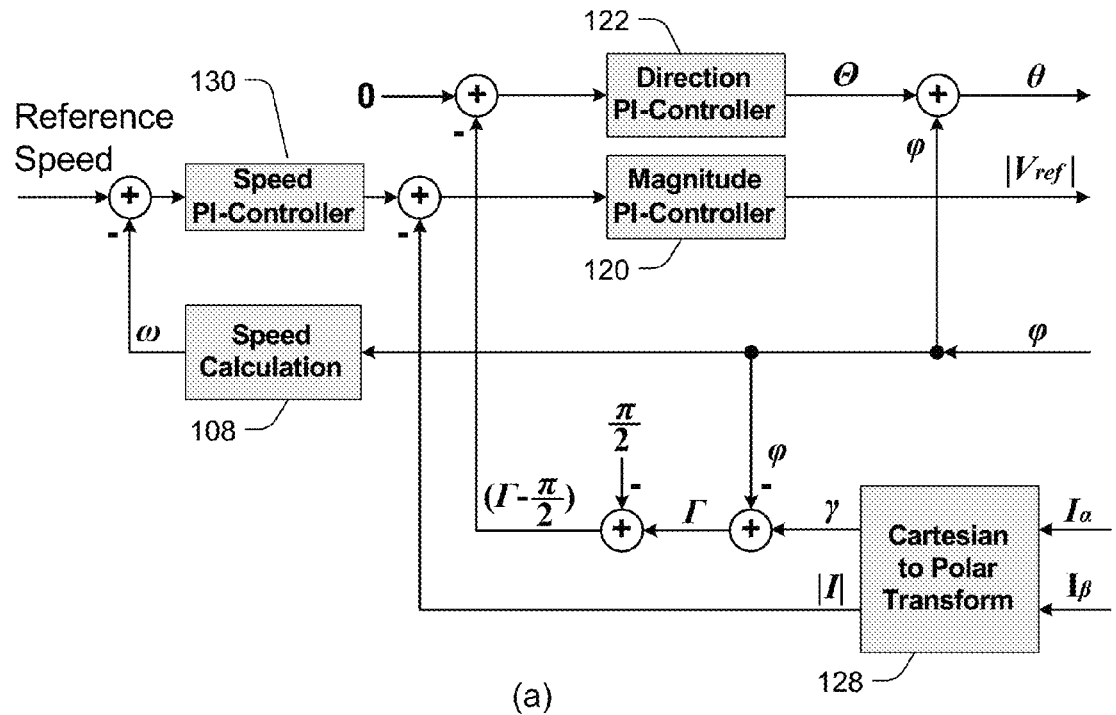
FIGS. 20 and 21 are block diagrams of alternate examples of optimized sensored and sensorless FOC arrangements, without Park Transform and Inverse Park Transform, according to other implementations. Only a portion of each of the example FOC arrangements is shown, for clarity.
Figure 20:
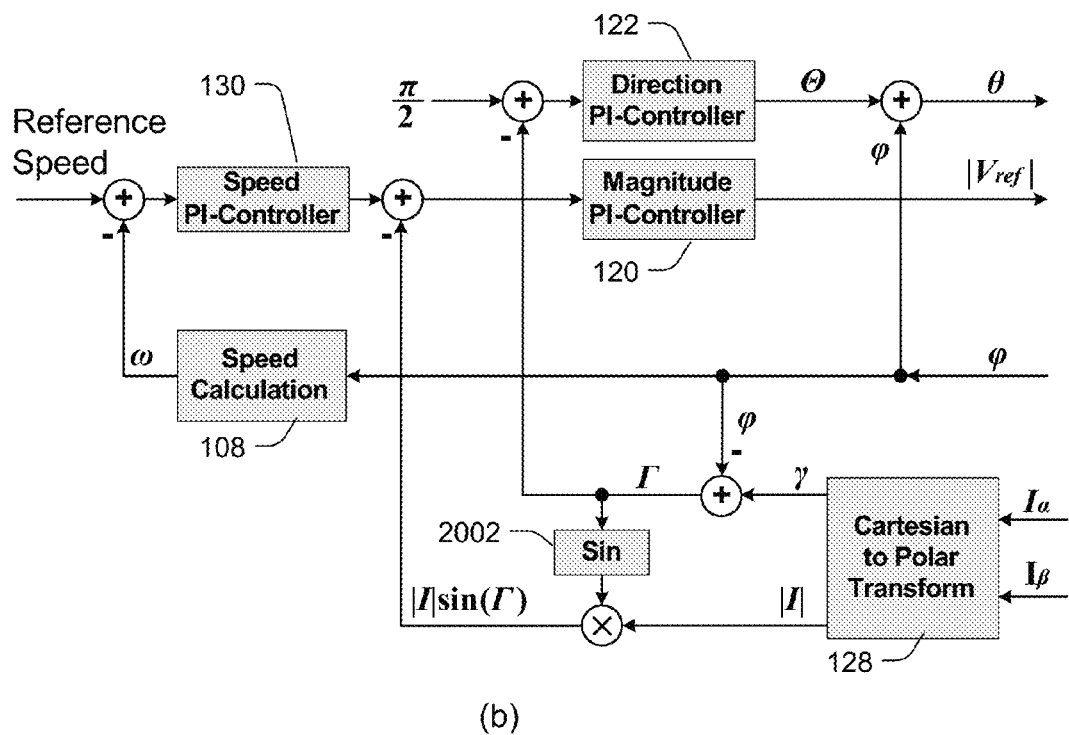
Figure 21:
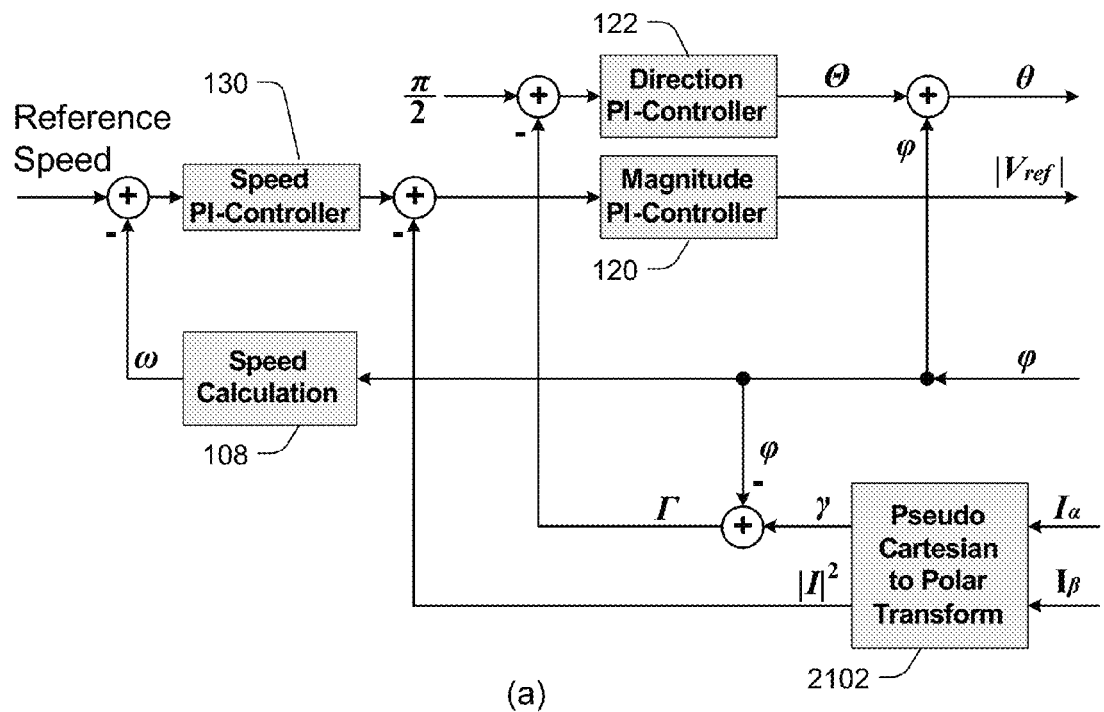
Figure 21:
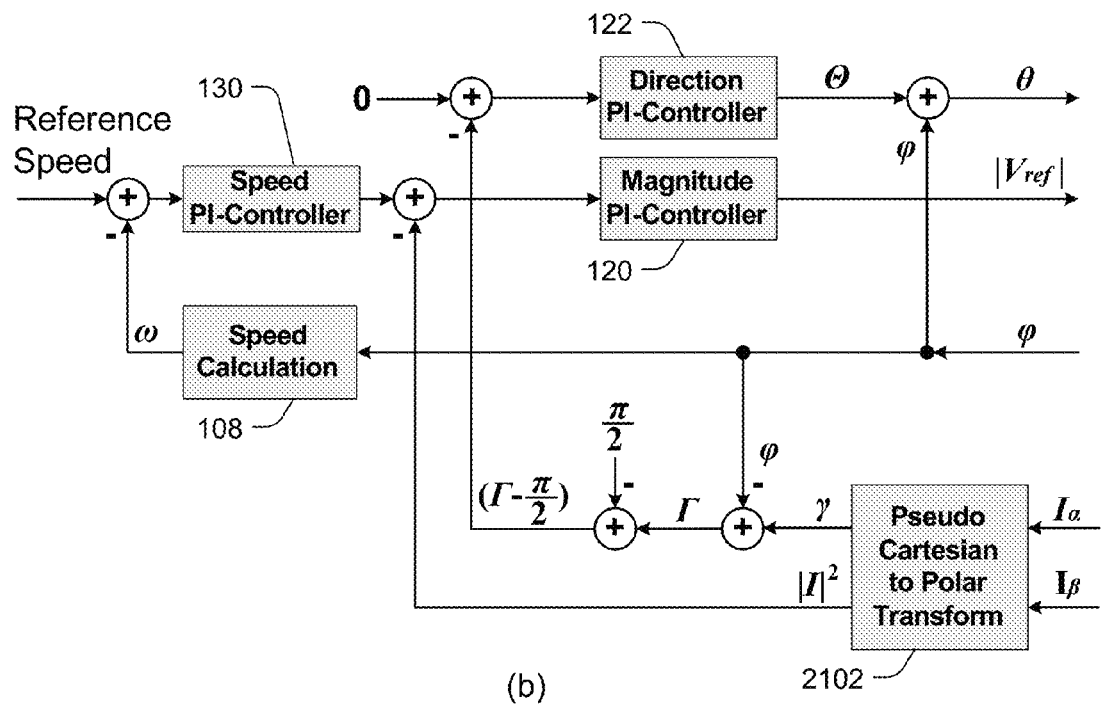

FIGS. 20 and 21 illustrate a few possible alternatives for both sensored and sensorless FOC arrangements 100 as depicted in FIGS. 16 and 17. For simplicity, only the left sides of the arrangements 100, which are common for both sensored and sensorless arrangements 100, are shown in FIGS. 20 and 21.

In various implementations, both sensored and sensorless FOC arrangements 100 can use (Γ−π/2) as feedback for the direction PI controllers 122. Additionally, FOC arrangements 100 can control (Γ−π/2) to 0, as shown in FIG. 20(a).

Referring to FIG. 20(b), on the feedback path to the magnitude PI controllers 120 of sensored and sensorless FOC arrangements 100, sine functions 2002 can be used in some applications (i.e., use torque generating component |I|sin(Γ) as the feedback as shown in FIG. 20(b). In steady state, the direction PI controller 122 forces Γ to be close to π/2, hence |I|sin(Γ) is very close to |I|. In case Γ is far from π/2 in transient state, the sine function 2002 can be calculated by the computing device (or look-up table). Alternatively, the sine function 2002 can be computed concurrently by a coprocessor of a microcontroller when the CPU is computing for the direction PI controller 122, to speed-up the fast control loop calculations.

In an implementation, as shown in FIGS. 21(a) and (b), the FOC arrangement 100 uses |I|$^2$=I$_α^2$+I$_β^2$ instead of |I| as the feedback of the magnitude PI controllers 120. This may improve performance when the selected microcontroller is faster at computing squares than the square root function, for example. In an example, as shown in FIGS. 21(a) and (b), a Pseudo Cartesian to Polar Transform 2102 may be used in place of the Cartesian to Polar Transform 128 used in the arrangements 100 of FIGS. 16 and 17. Example equations for the Pseudo Cartesian to Polar Transform 2102 include:

$$|I|^2 = I_α^2 + I_β^2 \text{ where } \gamma = \arctan\left(\frac{I_β}{I_α}\right)$$

Depending on different system requirements, the final control strategies can be any combinations of the new control strategies as shown in FIGS. 18-21. For example, FIG. 21(b) is a combination of the strategies shown in FIG. 20(a) and FIG. 21(a), respectively.

Example Rotor Position and Speed Observer Implementations

Figure 22:
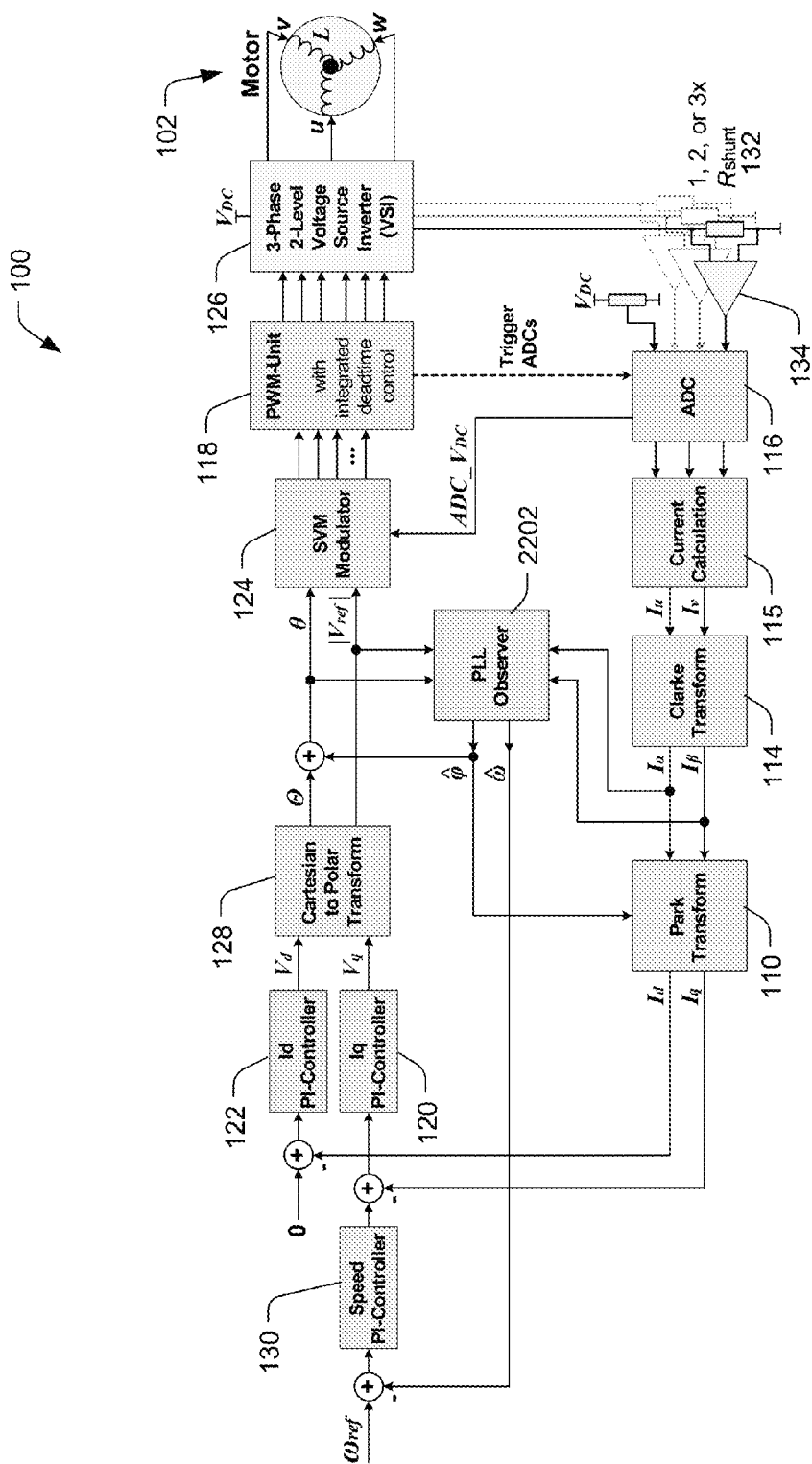
FIG. 22 is a block diagram of an example optimized sensorless FOC arrangement, having a PLL observer component, according to an implementation.

In an implementation, the sensorless FOC structure arrangement 100 of FIG. 22 includes the same (or similar)

motor 102 phase current sensing, ADC 116, and current calculation 115, Clarke Transform 114, Park Transform 110, PI controllers 120, 122, 130, SVM modulation 124, PWM unit 118, and 3-phase 2-level voltage source inverter 126 as the sensorless FOC arrangement 100 of FIG. 2. However, the FOC structure arrangement 100 of FIG. 22 uses Cartesian to Polar Transform 128 of $V_d/V_q$ and addition of angles $\theta = \Phi + \hat{\phi}$ to replace conventional Inverse Park Transform 112 of $V_d/V_q$ and Cartesian to Polar Transform 128 of $V_\alpha/V_\beta$.

In various implementations, as shown in FIG. 22, a sensorless FOC structure arrangement 100, which can include method or process steps of operation, includes a stator-resistance-insensitive rotor position and speed observer 2202 with a phase-locked loop (PLL) structure ("PLL observer" hereinafter). The PLL observer 2202 uses the relatively stable stator inductance L and does not rely on stator resistance R, resulting in robust operation over a wide temperature range. In an implementation, the PLL observer 2202 uses |Vref|, θ, Iα and Iβ (or similar) to estimate the rotor position and speed. Further, the PLL observer 2202 uses a PLL structure to estimate the rotor position and/or speed, and to force $$\varepsilon = |V_{ref}|\sin(\gamma - \theta) + \omega L|I| \approx 0 \left( \text{or } \frac{\varepsilon}{L} = \frac{|V_{ref}|}{L}\sin(\gamma - \theta) + \omega|I| \approx 0 \right)$$

constantly, which forces the stator flux to be perpendicular to the rotor flux, maximizing energy efficiency of the motor 102. Further, this will also drive the estimated rotor position $\hat{\phi}$ and estimated speed $\hat{\omega}$ to be very close to their real quantities φ and ωr, respectively.

In one implementation, for example as shown in FIG. 22, the PI controller 130 is not used. In such an implementation, a reference current for the torque generating component Iq is input directly to the summing junction fed by the PI controller 130 illustrated in the figures, eliminating the need for the PI controller. The PLL observer 2202, as well as the $\hat{\omega}$additional illustrated PLL observers described herein, in such a scenario does not provide the output as an input to the PI controller 130.

Figure 23:
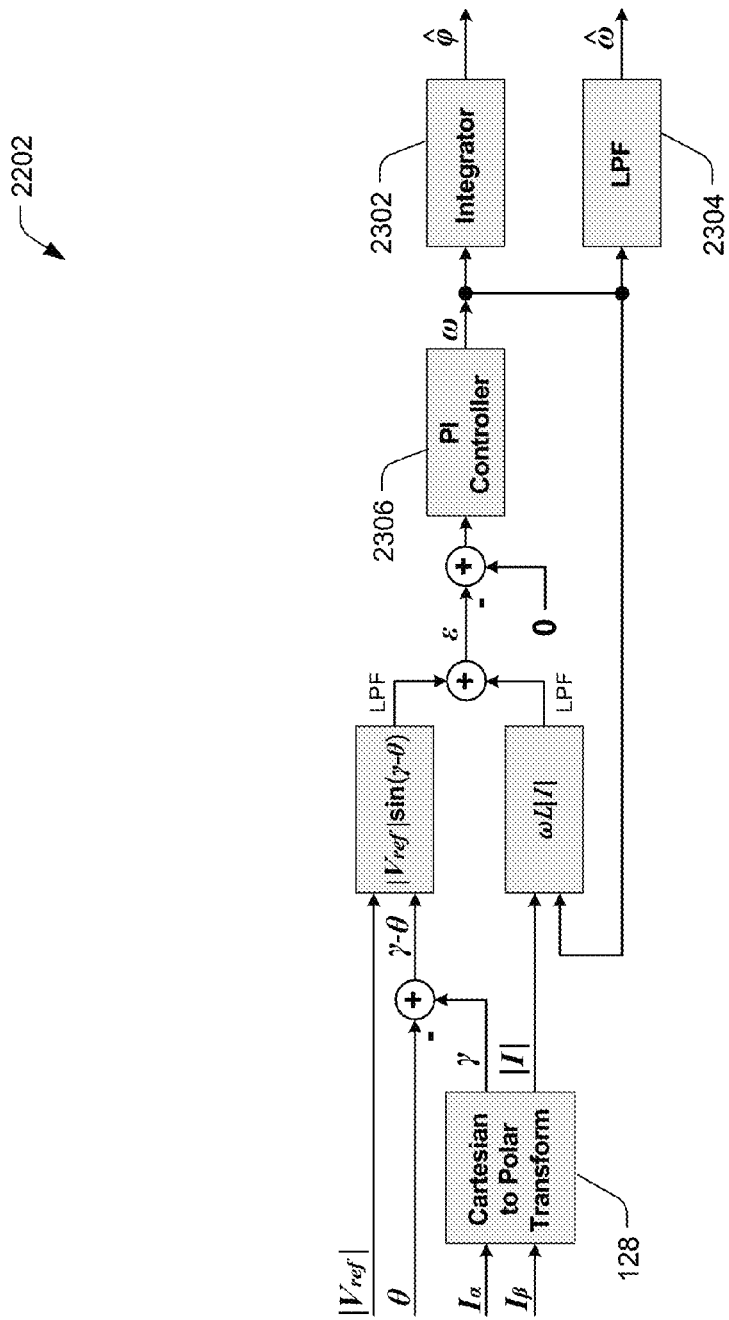
FIGS. 23 and 24 illustrate two example PLL observers that may be used with the FOC arrangement of FIG. 22, according to implementations.
Figure 24:
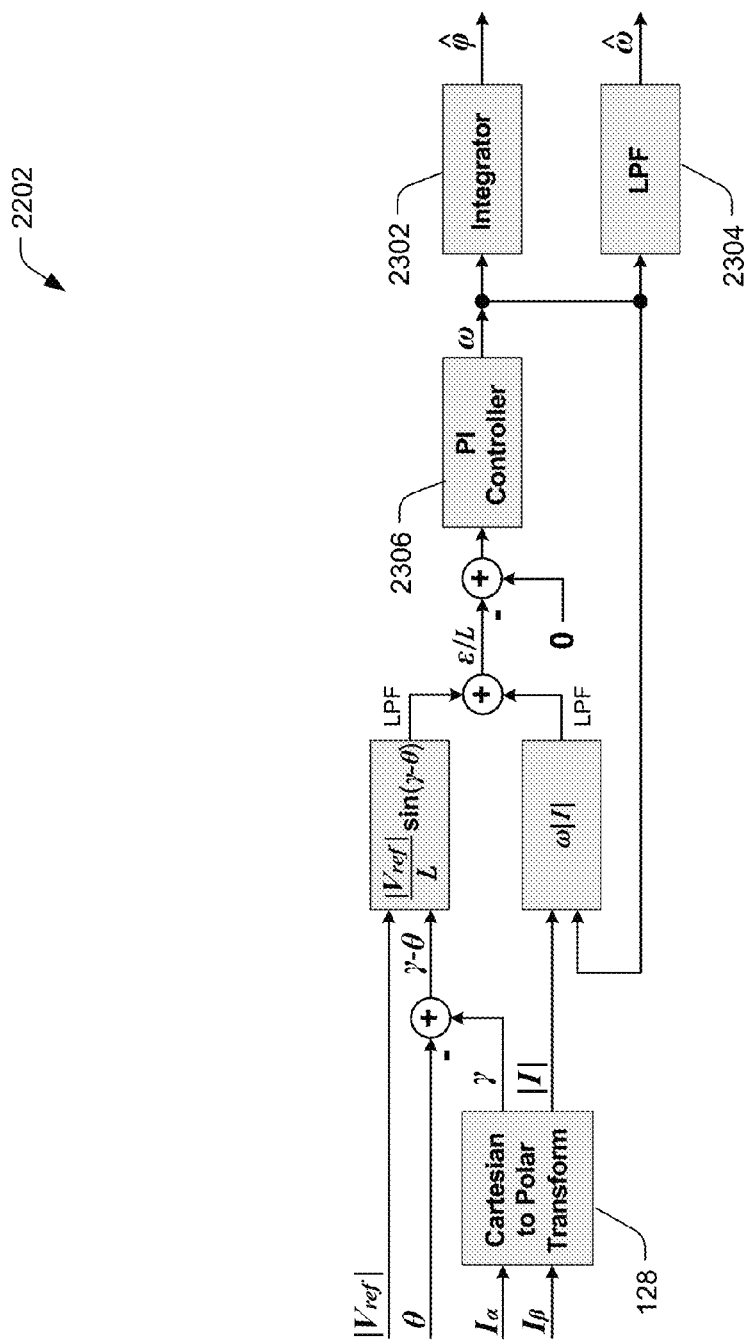

FIGS. 23 and 24 illustrate two alternate examples of PLL observers 2202. The sensorless FOC arrangement 100 with PLL observer 2202 (as shown in FIG. 22) can lock the motor 102 at a desired speed with maximum energy efficiency in steady state, regardless of low motor speed (due to the stator-resistance-insensitivity) or high motor speed. So the PLL observer 2202 can easily eliminate the need for a mechanical rotor sensor 104, which can be expensive and trouble-prone.

In various implementations, as shown in FIGS. 23 and 24, the PLL observer 2202 uses |Vref|, θ, Iα and Iβ as input signals, and outputs estimated rotor position $\hat{\phi}$ (via integrator 2302, for example) and speed $\hat{\omega}$ (via low pass filter (LPF) 2304, for example). The PI controller 2306 output speed w is used in the calculation of ωL|I| or ω|I| in the next control cycle, forming a PLL structure. In some examples, an optional low pass filter LPF 2304 can be applied to both $|V_{ref}|\sin(\gamma-\theta)$ and L|I|, as shown in FIG. 23, or to $\varepsilon=|V_{ref}|\sin(\gamma-\theta)+\omega L|I|$ directly. In various examples, the PI controller 2306 can be any other controllers that are appropriate.

Figure 25:
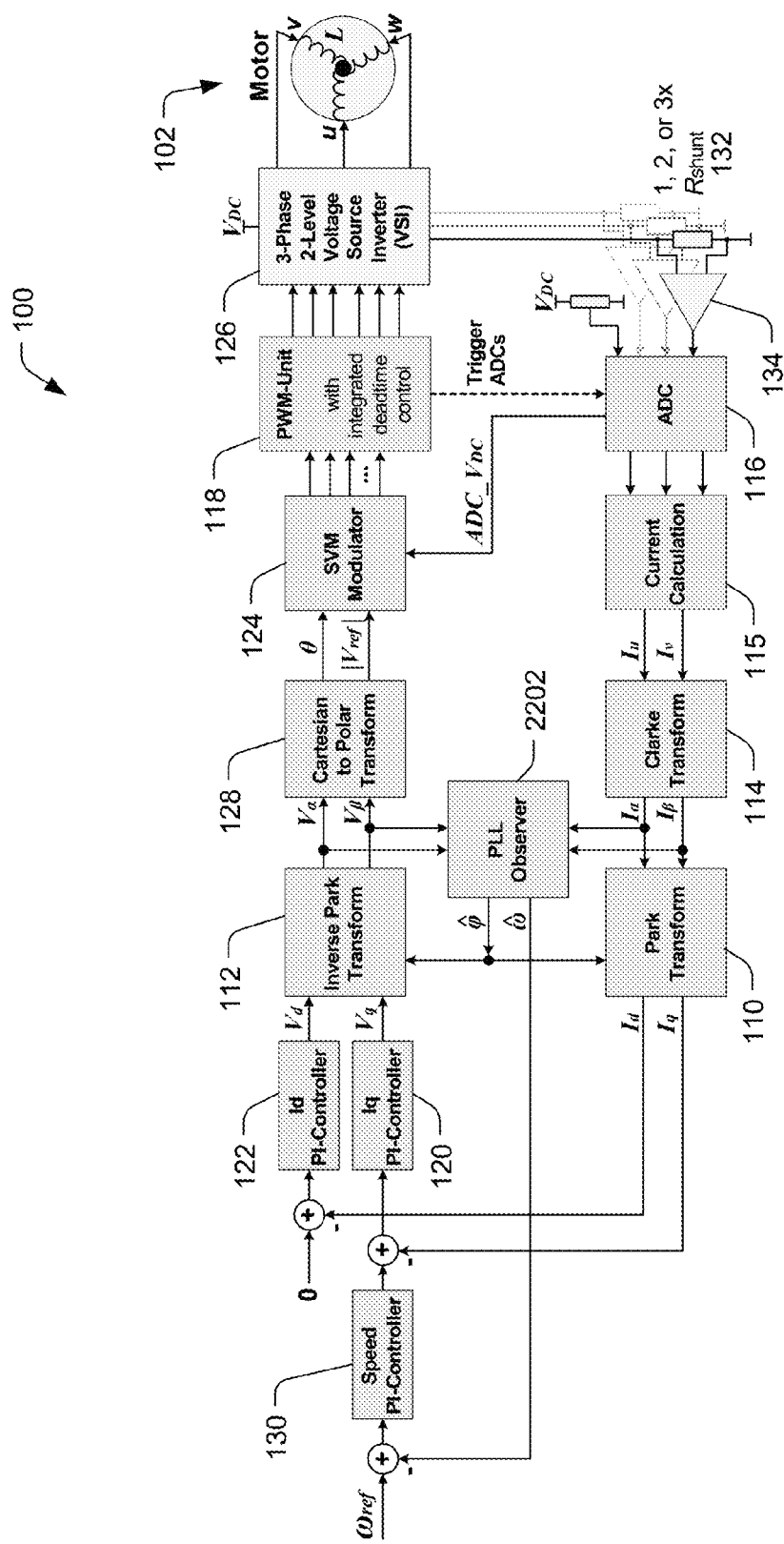
FIG. 25 is a block diagram of another example optimized sensorless FOC arrangement, having a PLL observer component, according to another implementation.

FIG. 25 shows an alternative sensorless FOC arrangement 100, having an alternate PLL observer 2202. The arrangement 100 of FIG. 25 is similar to the arrangement 100 of FIG. 2, except the position estimator 202 and speed calculation 108 have been replaced by a new alternate PLL observer 2202. In some implementations, the Cartesian to Polar Transform 128 of ($V_\alpha$, $V_\beta$) of FIG. 25 can be neglected, and instead the voltages $V_\alpha$ and $V_\beta$ are sent to the SVM modulator 124 directly.

Figure 26:
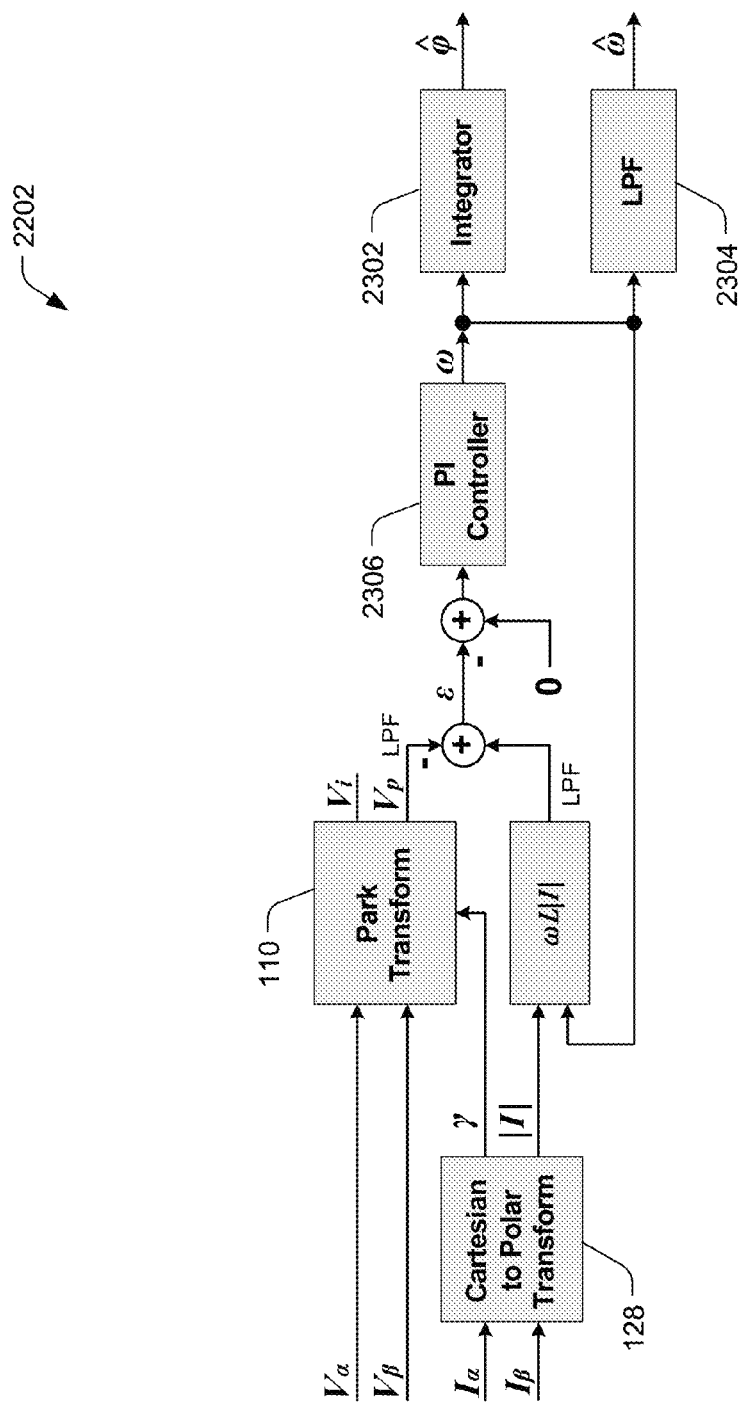
FIGS. 26 and 27 illustrate two example PLL observers that may be used with the FOC arrangements of FIG. 25 and FIG. 22, respectively, according to implementations.

The alternate PLL observer 2202 of FIG. 25 is elaborated in FIG. 26. The input signals to this PLL observer are $V_\alpha$, $V_\beta$, $I_\alpha$ and $I_\beta$. The Park Transform 110 of the voltage space vector with the angle of the current space vector (i.e., γ) is:

$$V_i = V_\alpha \cos(\gamma) + V_\beta \sin(\gamma) \tag{31}$$

$$V_p = -V_\alpha \sin(\gamma) + V_\beta \cos(\gamma) \tag{32}$$

where:

$V_i$—Component of voltage space vector in the direction of the current space vector.

$V_p$—Component of voltage space vector in the direction perpendicular to current space vector.

Note the following Polar to Cartesian Transform 1302 of the voltage space vector:

$$V_\alpha = |V_{ref}|\cos(\theta) \tag{33}$$

$$V_\beta = |V_{ref}|\sin(\theta) \tag{34}$$

Combine Equations (32), (33) and (34) to get:

$$V_p = |V_{ref}|\sin(\theta-\gamma) \tag{35}$$

With Equation (35), the feedback signal to the PI controller 2306 shown in FIG. 26 can be written as:

$$\varepsilon = \omega L |I| - V_p = |V_{ref}|\sin(\gamma-\theta) + \omega L|I| \tag{36}$$

The table below summarizes the mathematical transformations used by the sensorless FOC arrangement 100 with alternate PLL observer as shown in FIGS. 25 and 26.

| Transformation | Equations [Note 1] |
|---|---|
| Clarke Transform | $I_\alpha = I_u$ <br> $I_\beta = (I_u + 2I_v)/\sqrt{3}$ <br> $(I_u + I_v + I_w = 0)$ |
| Park Transform of current with angle $\hat{\phi}$ | $I_d = I_\alpha \cos(\hat{\phi}) + I_\beta \sin(\hat{\phi})$ <br> $I_q = -I_\alpha \sin(\hat{\phi}) + I_\beta \cos(\hat{\phi})$ |
| Inverse Park Transform | $V_\alpha = V_d \cos(\hat{\phi}) - V_q \sin(\hat{\phi})$ <br> $V_\beta = V_d \sin(\hat{\phi}) + V_q \cos(\hat{\phi})$ |
| Cartesian to Polar Transform of voltage | $|V_{ref}| = \sqrt{V_\alpha^2 + V_\beta^2}$ <br> $\theta = \arctan\left(\frac{V_\beta}{V_\alpha}\right)$ |
| Cartesian to Polar Transform of current | $|I| = \sqrt{I_\alpha^2 + I_\beta^2}$ <br> $\gamma = \arctan\left(\frac{I_\beta}{I_\alpha}\right)$ |
| Park Transform of voltage with angle γ | $V_i = V_\alpha \cos(\gamma) + V_\beta \sin(\gamma)$ <br> $V_p = -V_\alpha \sin(\gamma) + V_\beta \cos(\gamma)$ |

Note 1:
The superscript "^" denotes the estimated quantities.

Figure 27:
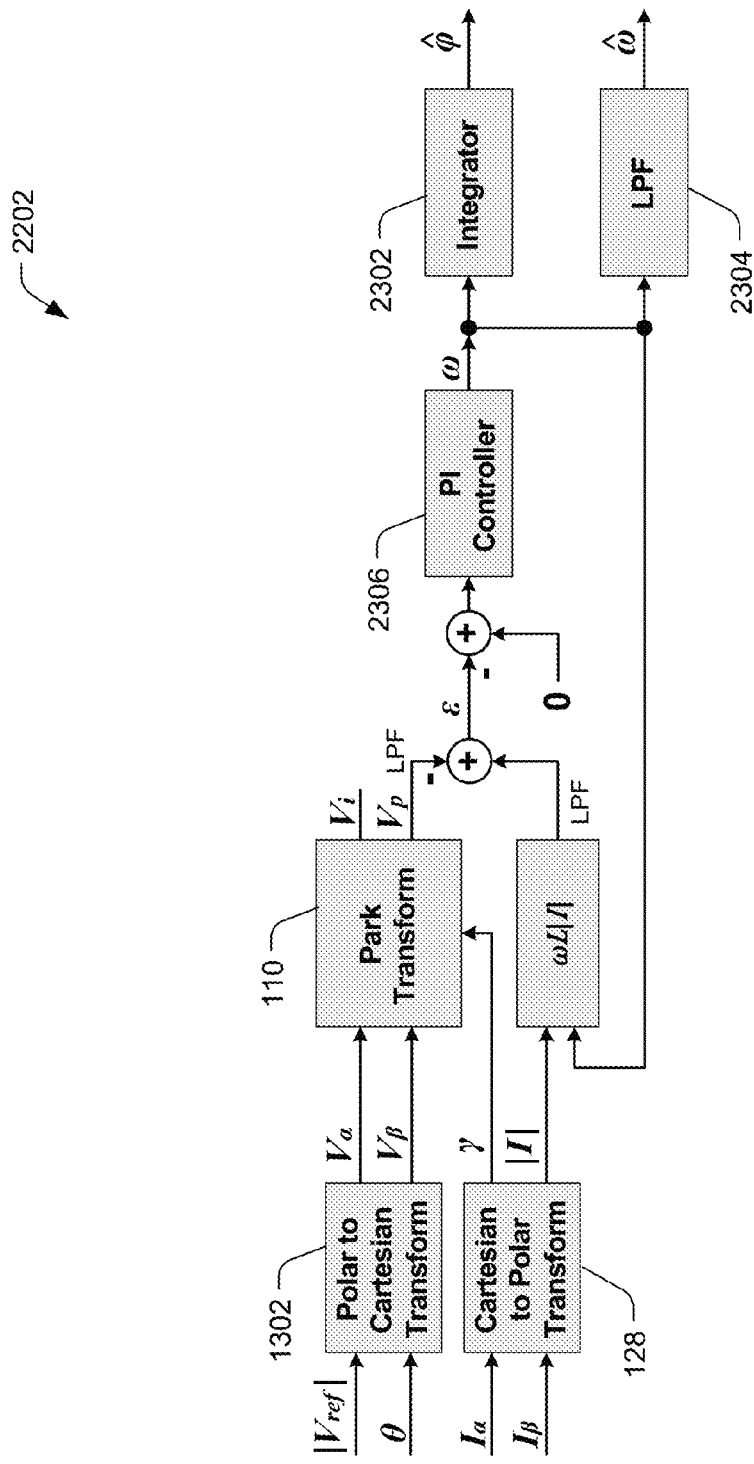

Another alternative PLL observer is shown in FIG. 27. It uses $|V_{ref}|$, θ, $I_\alpha$, and $I_\beta$ as inputs and thus can replace the PLL observer shown in FIG. 22. With the same processor, this alternative PLL observer may use slightly longer calculation time when compared to the PLL observers shown FIGS. 23 and 24.

Example Maximum Efficiency Tracking (MET) Control Strategies

Most existing position and speed estimators for sensorless FOC controllers are based on back electro-motive force (BEMF), and do not work well at zero or low motor speed.

So an open-loop motor startup (e.g., V/f control) is used for these sensorless FOC controllers. A typical 2-step motor startup mechanism is V/f open-loop→FOC closed-loop:

1). First the motor will start to turn by a V/f open-loop control and ramp up to a user-defined speed;
2). from this point on the FOC closed-loop control will handle the motor.

V/f open-loop control can have poor energy efficiency; and generally the higher the motor speed, the greater power it consumes. A typical 2-step motor startup mechanism normally transitions from V/f open-loop to FOC closed-loop at relatively high motor speed, causing a high startup power (or current). Furthermore, it can be problematic to fine-tune the estimator to achieve smooth transition from open-loop startup to closed-loop FOC operation for all working conditions.

Maximum Efficiency Tracking (MET) is a sensorless control technique (as shown with the example MET control strategies 2800 of FIGS. 28-31, and which can include method or process steps of operation) for a motor 102, and tracks the maximum energy efficiency of the motor 102. It uses the relatively stable stator inductance L and is not sensitive to the stator resistance R. Further, a MET control technique can be used with the sensorless FOC structure arrangements 100 discussed herein for smooth transitions from open-loop startup to closed-loop control.

Figure 28:
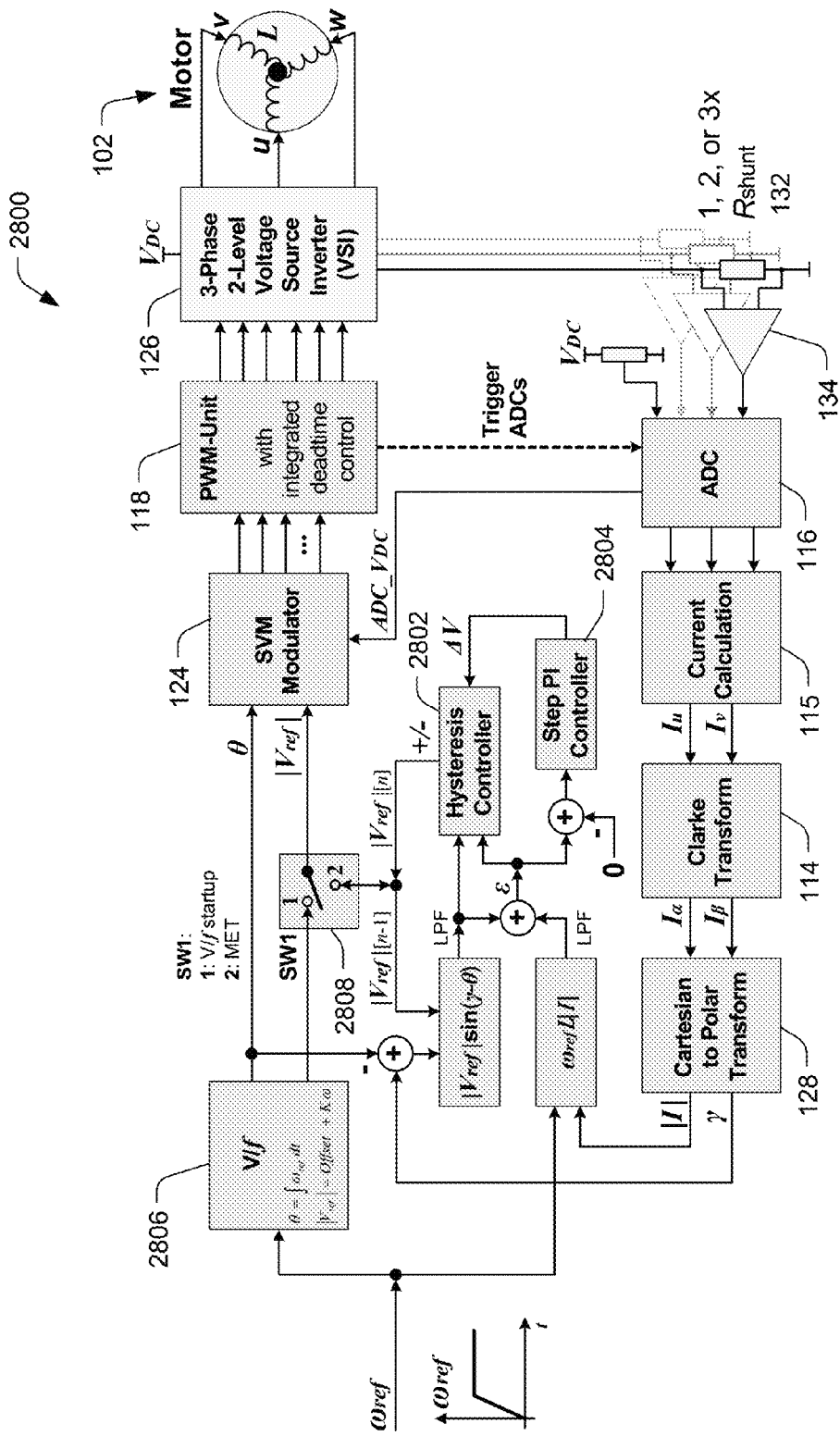
FIGS. 28 and 29 are block diagrams of example maximum efficiency tracking (MET) control strategies according to implementations.
Figure 29:
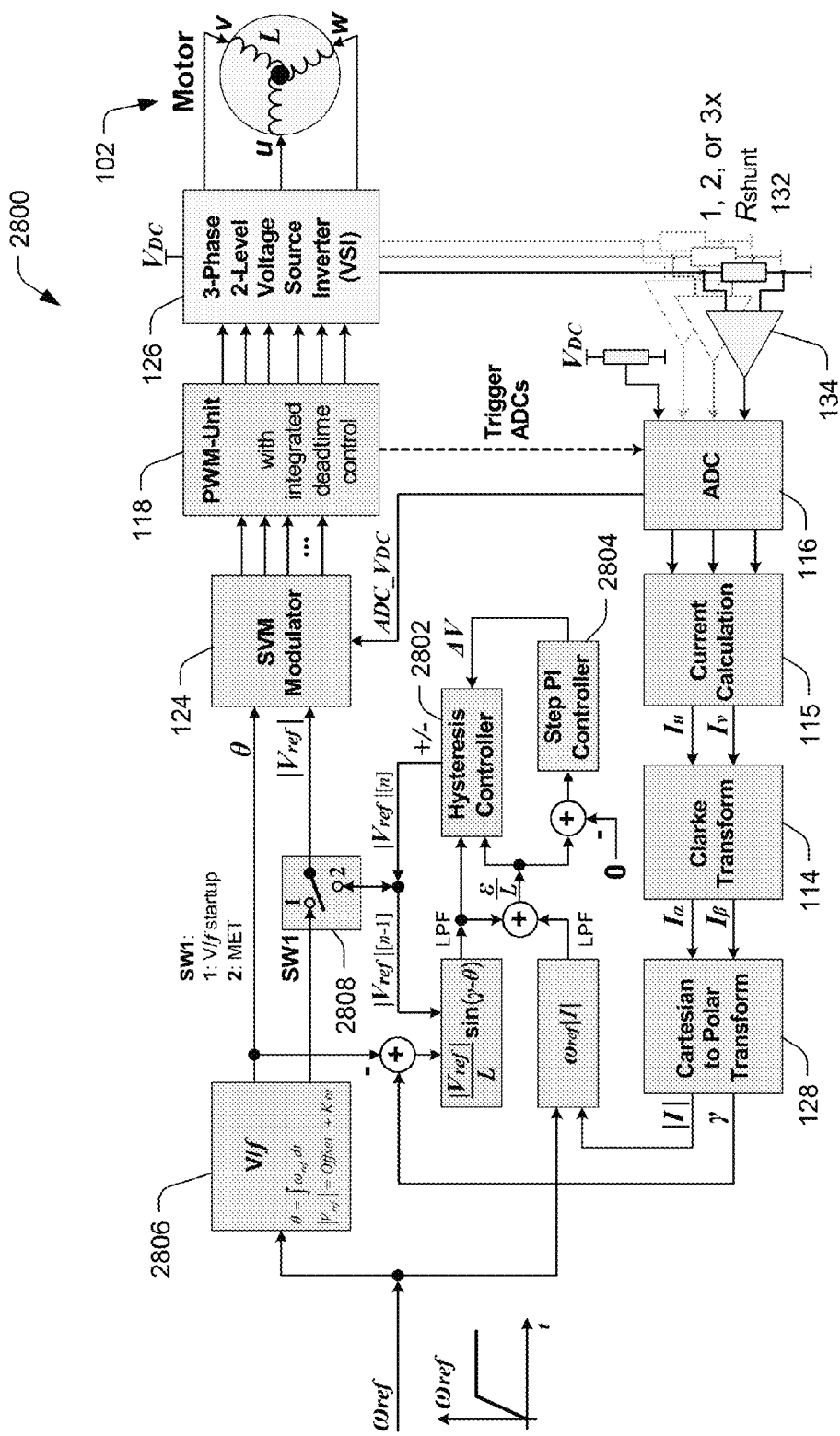

In an implementation, a MET control technique includes changing the angle θ of the SVM 124 reference vector $\vec{V}_{ref}$ at constant speed, as set by a user-defined reference speed $$\left(\text{i.e., } \theta = \int \omega_{ref} dt, \text{ or } \frac{d\theta}{dt} = \omega_{ref}\right);$$

and concurrently controlling the magnitude |Vref| to force $\epsilon = |V_{ref}|\sin(\gamma-\theta)+\omega_{ref}L|I| \approx 0$ for the MET arrangement 2800 of FIG. 28, or $$\frac{\varepsilon}{L} = \frac{|V_{ref}|}{L}\sin(\gamma - \theta) + \omega_{ref}|I| \approx 0$$

for the MET arrangement 2800 of FIG. 29, constantly, thus forcing the stator flux to be perpendicular to the rotor flux, and maximizing the energy efficiency of the motor 102.

In various implementations, the MET control technique for a FOC structure arrangement 100 achieves a 3-step motor 102 startup: V/f open-loop→MET closed-loop→FOC closed-loop. This 3-step motor 102 startup sequence provides smooth and low-power startup for sensorless FOC arrangements 100.

FIGS. 28-31 illustrate sensorless MET control arrangements 2800. A MET arrangement 2800 has the same motor 102 phase current sensing, ADC 116 and current calculation 115, Clarke Transform 114, SVM modulation 124 and PWM unit 118, and 3-phase 2-level voltage source inverter 126 as the sensorless FOC arrangement 100 of FIG. 2. However, the sensorless MET arrangements 2800 have no Park Transform 110 or Inverse Park Transform 112, no position estimator 202 or speed estimator 108, and one PI controller 2804.

In various implementations, MET arrangements 2800 use a Cartesian to Polar Transform 128 to get magnitude and angle information of the current space vector, instead of a voltage space vector, as in FOC arrangements. In an implementation, MET arrangements 2800 use a V/f open-loop motor startup 2806 (SW1 2808 is in position 1) and then transition (e.g., switch) to closed-loop maximum efficiency tracking (SW1 2808 is in position 2) after reaching a predetermined motor 102 speed. During maximum efficiency tracking, the SVM 124 reference vector angle θ changes at constant speed as set by the reference speed $\omega_{ref}$. In an implementation, the reference vector magnitude |V_{ref}| is controlled by a hysteresis controller 2802 to force $$\varepsilon = |V_{ref}|\sin(\gamma - \theta) + \omega_{ref}L|I| \approx 0 \text{ or } \frac{\varepsilon}{L} = \frac{|V_{ref}|}{L}\sin(\gamma - \theta) + \omega_{ref}|I| \approx 0.$$

For example, this forces the motor 102 stator flux to be perpendicular to the rotor flux, maximizing the energy efficiency of the motor 102.

In an implementation, as shown in FIG. 28, when the reference vector magnitude |V_{ref}| needs a change (increase or decrease), its change step ΔV can be a user-defined constant, or can be calculated by a step PI controller 2804 to achieve rapid torque response. If the motor 102 rotates in the positive direction, normally, the current space vector is lagging the voltage space vector and $$|V_{ref}|\sin(\gamma - \theta) < 0 \left(\text{or } \frac{|V_{ref}|}{L}\sin(\gamma - \theta) < 0\right).$$

If $$|V_{ref}|\sin(\gamma - \theta) \geq 0 \left(\text{or } \frac{|V_{ref}|}{L}\sin(\gamma - \theta) \geq 0\right),$$

it is an urgent condition and the magnitude |V_{ref}| is increased. Note that in some examples, an optional LPF can be applied to both |V_{ref}|sin(γ-θ) and $\omega_{ref}$|I|, for implementations as shown in FIG. 28, or to $\epsilon=|V_{ref}|\sin(\gamma-\theta)+\omega_{ref}L|I|$.

The table below compares the building blocks and mathematical transformations used in the FOC arrangement 100 of FIG. 2 and a MET arrangement 2800 as in FIGS. 28-31.

| Building Blocks | For FOC arrangement 100 of FIG. 2 | For FOC arrangement 100 having MET (FIGS. 28-31) |
|---|---|---|
| V/f Open-Loop Startup Motor Phase Current Sensing, ADC, and Current Calculation SVM Modulator, PWM, and Inverter | Same for all sensorless FOC arrangements 100. | |

-continued

| Building Blocks | For FOC arrangement 100 of FIG. 2 | For FOC arrangement 100 having MET (FIGS. 28-31) |
|---|---|---|
| Clarke Transform | Same for all sensorless FOC arrangements 100. It is: $I_\alpha = I_u$ $I_\beta = (I_u + 2I_v)/\sqrt{3}$ $(I_u + I_v + I_w = 0)$ | |
| Park Transform | $I_d = I_\alpha \cos(\phi) + I_\beta \sin(\phi)$ $I_q = -I_\alpha \sin(\phi) + I_\beta \cos(\phi)$ | Not used |
| Inverse Park Transform | $V_\alpha = V_d \cos(\phi) - V_q \sin(\phi)$ $V_\beta = V_d \sin(\phi) + V_q \cos(\phi)$ | Not used |
| Cartesian to Polar Transform | $\|V_{ref}\| = \sqrt{V_\alpha^2 + V_\beta^2}$ $\theta = \arctan\left(\frac{V_\beta}{V_\alpha}\right)$ | $\|I\| = \sqrt{I_\alpha^2 + I_\beta^2}$ $\gamma = \arctan\left(\frac{I_\beta}{I_\alpha}\right)$ |
| Rotor Position and Speed Estimation/ Control | Use BEMF-based flux estimator, PLL estimator, SMO, or similar to estimate rotor position and speed. Use three PI controllers. Control rotor speed $\omega$ = reference speed $\omega_{ref}$, $I_d = 0$, and $I_q \propto$ torque. Uses motor parameters R and L, or more. | No rotor position and speed estimator. Use one PI controller, and one hysteresis controller. SVM 124 reference vector angle θ changes at reference speed, $\theta = \int \omega_{ref} dt$. Control magnitude $\|V_{ref}\|$ to force: $\epsilon = \|V_{ref}\|\sin(\gamma - \theta) + \omega_{ref}L\|I\| \approx 0$ or $\frac{\epsilon}{L} = \frac{\|V_{ref}\|}{L}\sin(\gamma - \theta) + \omega_{ref}\|I\| \approx 0$ Uses motor parameter L. |

In various implementations, a MET arrangement 2800 includes a smooth transition from V/f open-loop startup to MET closed-loop, even at relatively low motor speed. For example, MET technique can be integrated to sensorless FOC arrangements 100 to apply a 3-step motor startup, which is V/f open-loop→MET closed-loop→FOC closed-loop:

1). First the motor will start to turn by a V/f open-loop control to a user-defined speed;
2). Then MET closed-loop control will take over and smoothly make the stator flux perpendicular to the rotor flux, i.e., $$\varphi \approx \gamma - \frac{\pi}{2};$$

3). Thereafter the sensorless FOC arrangement 100 closed-loop control will handle the motor 102. The initial rotor angle (if used) for the sensorless FOC arrangement 100 is estimated as $$\varphi = \gamma - \frac{\pi}{2}$$

for smooth transition from MET to FOC closed-loop control.

If desired, FOC closed-loop control can transition to MET closed-loop control at any time to fully use the advantages of MET technique, and users can decide when to transition back to FOC closed-loop again.

MET has at least the following advantages, and in some implementations, may have other advantages as well. Without calculation-intensive rotor position 202 and speed estimator 108, no transformations to/from rotor-fixed d-q coordinate system (110, 112), and with one PI controller 2804, MET is easy to fine-tune for applied motors 102, and the CPU time for MET is also much less. In examples, MET can reduce CPU load and save precious CPU time for other purposes (e.g., digital PFC, multiple PMSM motor drive, HMI, communications, safety checking, etc.) in sophisticated systems, hence the potential and features of the microcontroller can be fully used. Conversely, using a MET control technique, users can select a microcontroller with less computation power and lower cost to accomplish motor 102 controls.

Since it is possible to transition from V/f open-loop to energy-efficient MET closed-loop at much lower motor speed, the typical high startup power of existing 2-step motor startup mechanism can be avoided. Because MET has already made the stator flux perpendicular to the rotor flux smoothly, the PI controllers of FOC won't over-react, struggling to make them perpendicular from non-perpendicular conditions that caused by V/f open-loop control. Thus smooth startup transitions in sensorless FOC can be easily achieved. In various implementations, additional or alternative components may be used to accomplish the disclosed techniques and arrangements.

Figure 30:
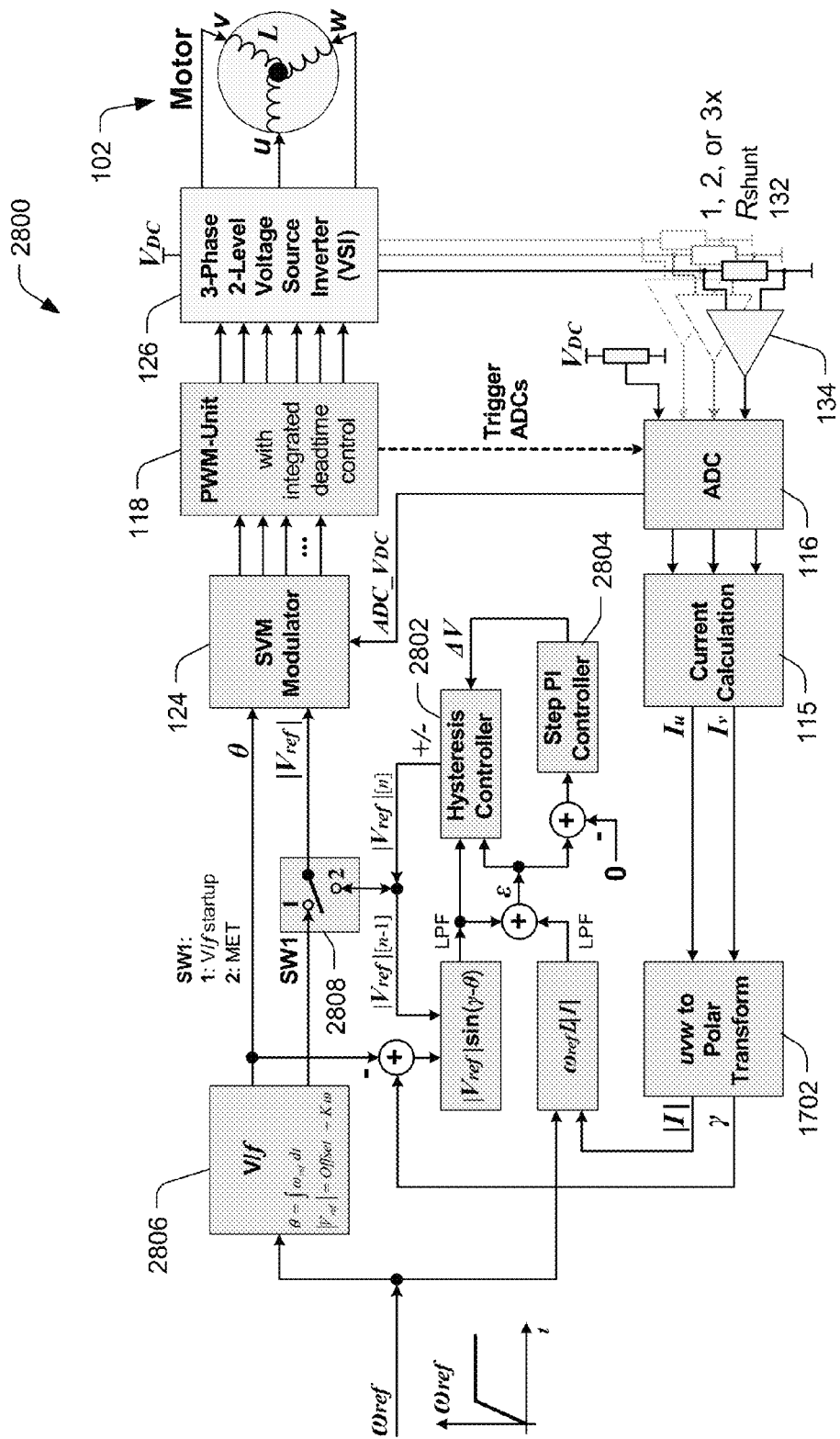
FIGS. 30 and 31 are block diagrams of alternate example maximum efficiency tracking (MET) control strategies according to other implementations.

Referring to FIG. 30, another MET control technique is illustrated where the current variables $I_\alpha$ and $I_\beta$ are inessential. In the implementation shown, the Clarke Transform 114 of FIGS. 28 and 29 is bypassed, and a direct uvw to Polar Transform 1702 is used in place. The direct uvw to Polar Transform 1702 can be described by the equations:

$$\|I\| = K_{\|I\|} \cdot \sqrt{I_u^2 + I_v^2 + I_u I_v} \tag{37}$$

$$\gamma = \arctan\left(\frac{I_u + 2I_v}{\sqrt{3} \cdot I_u}\right) \tag{38}$$

where: $K_{|I|}$ is a scaling factor of the current space vector magnitude; $K_{|I|}=\sqrt{3}$.

In an implementation, the scaling factor $K_{|I|}=\sqrt{3}$ can be neglected (i.e., make $K_{|I|}=1$). Alternatively, the scaling of $\sqrt{3}$ can be combined with other scaling computations (e.g., current sensing and amplification, analog-to-digital conversion, etc.).

Figure 31:
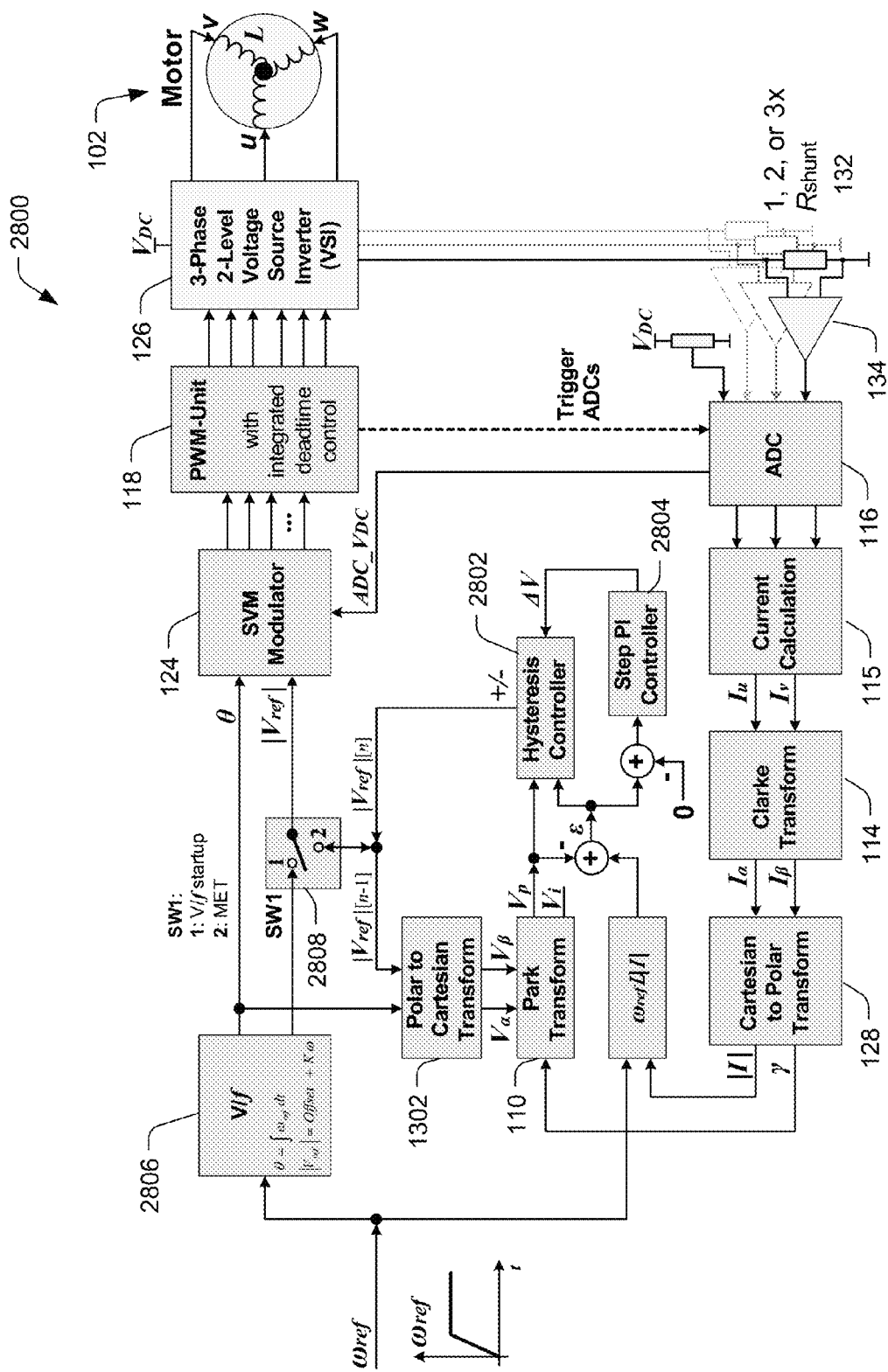

Referring to FIG. 31, a MET control technique is illustrated that includes a Park Transform 110 of the voltage space vector, with the angle of the current space vector γ, given by the equations:

$$V_i = V_\alpha \cos(\gamma) + V_\beta \sin(\gamma) \quad (39)$$

$$V_p = -V_\alpha \sin(\gamma) + V_\beta \cos(\gamma) \quad (40)$$

where:
$V_i$—Component of voltage space vector in the direction of the current space vector.
$V_p$—Component of voltage space vector in the direction perpendicular to current space vector.

In an implementation, the Polar to Cartesian Transform 1302 of the voltage space vector shown in FIG. 14 is described by:

$$V_\alpha = |V_{ref}|\cos(\theta) \quad (41)$$

$$V_\beta = |V_{ref}|\sin(\theta) \quad (42)$$

Equations (40), (41) and (42) may be combined to yield:

$$V_p = |V_{ref}|\sin(\theta-\gamma) \quad (43)$$

Using equation (43), the voltage difference E shown in FIG. 31 can be written as:

$$\epsilon = \omega_{ref}L[I] - V_p = |V_{ref}|\sin(\gamma-\theta) + \omega_{ref}L|I| \quad (44)$$

CONCLUSION

Although the implementations of the disclosure have been described in language specific to structural features and/or methodological acts, it is to be understood that the implementations are not necessarily limited to the specific features or acts described. Rather, the specific features and acts are disclosed as representative forms of implementing example devices and techniques.

What is claimed is:

1. A field oriented control (FOC) structure arranged to provide variable speed control for an electric motor, comprising:
   a modulator arranged to receive a vector quantity representing a desired rotational position and/or desired speed of a rotor of the motor, and to output a plurality of control signals to adjust a rotational position and/or speed of the motor, based on the vector quantity, the vector quantity comprising a magnitude and an angle of a complex voltage space vector, the angle arranged to change at a constant user-defined speed;
   a switch arranged to switch the FOC structure between open loop operation and closed loop operation; and
   one or more feedback loops arranged to adjust the magnitude of the complex voltage space vector based on processing one or more motor winding current values.

2. The FOC structure of claim 1, further comprising a pulse-width modulation (PWM) unit arranged to receive the plurality of control signals and to output a PWM signal to adjust the rotational position and/or speed of the motor, based on the vector quantity.

3. The FOC structure of claim 1, further comprising a voltage source inverter component arranged to receive a PWM signal and to output three-phase sinusoidal waveforms to windings of the motor, to adjust the rotational position and/or speed of the motor, based on the vector quantity.

4. The FOC structure of claim 1, further comprising a Clarke Transform module arranged to transform two-phase or three-phase motor winding current value coordinates into a stationary two-phase reference frame.

5. The FOC structure of claim 1, further comprising a Cartesian to polar transform module arranged to transform a set of two-phase stationary coordinates into the angle and a magnitude of the polar coordinate current space vector.

6. The FOC structure of claim 1, further comprising a hysteresis controller arranged to determine a voltage per frequency value for startup of the motor while the FOC structure is in an open-loop operation and to determine the magnitude of the complex voltage space vector while the FOC structure is in the closed-loop operation for steady state.

7. The FOC structure of claim 1, further comprising a hysteresis controller arranged to force a stator flux of the motor to be perpendicular to a rotor flux of the motor.

8. The FOC structure of claim 1, wherein the magnitude of the complex voltage space vector changes when the FOC structure is switched between open loop operation and closed loop operation.

9. The FOC structure of claim 1, wherein the angle of the complex voltage space vector comprises an integral of an input rotational speed of the FOC structure.

10. The FOC structure of claim 1, wherein the FOC structure determines the angle of the complex voltage space vector based on the user-defined speed and without a rotor position sensor or a rotor position estimator.

11. A variable speed control arrangement for an electric motor, comprising:
    a modulator component arranged to receive a vector quantity representing a desired rotational position and/or desired speed of a rotor of the motor, and to output a plurality of control signals to adjust a rotational position and/or speed of the motor, based on the vector quantity, the vector quantity comprising a magnitude and an angle of a complex voltage space vector, the angle arranged to change at a constant user-defined speed;
    a pulse-width modulation (PWM) unit arranged to receive the plurality of control signals and to output a PWM signal based on the plurality of control signals;
    a voltage source inverter component arranged to receive the PWM signal and to output sinusoidal waveforms to windings of the motor, to adjust the rotational position and/or speed of the motor, based on the PWM signal;
    a switch arranged to switch the variable speed control arrangement between open loop operation and closed loop operation; and
    a feedback loop including a hysteresis controller and a proportional-integral (PI) controller, arranged to adjust the magnitude of the complex voltage space vector based on processing one or more motor winding current values and based on whether the variable speed control arrangement is in open-loop operation or closed loop operation.

12. The variable speed control arrangement of claim 11, further comprising a computing device arranged to calculate one or more transformations, including a transformation of Cartesian stationary coordinates based on one or more motor winding current values to a current space vector quantity.

13. The variable speed control arrangement of claim 11, wherein the variable speed control arrangement operates at open loop operation during startup and switches to closed loop operation when the motor reaches a user-defined motor speed.

14. A method, comprising:
receiving, at a modulator, a vector quantity representing a desired rotational position and/or desired speed of a rotor of an electric motor, the vector quantity comprising a magnitude and an angle, the angle arranged to change at a constant user-defined speed;
outputting, at the modulator, a plurality of control signals to adjust a rotational position and/or speed of the motor based on the vector quantity;
switching from an open-loop operating mode to a closed-loop operating mode when the motor reaches a user-defined rotational speed;
adjusting, via a feedback loop, the magnitude of the vector quantity based on processing one or more motor winding current values; and
providing variable speed control to the motor based on the receiving and the adjusting.

15. The method of claim 14, further comprising determining the angle of the complex voltage space vector by integrating an input rotational speed, without the use of a position estimator or a position sensor.

16. The method of claim 14, further comprising determining a voltage per frequency value for startup of the motor while operating in the open-loop operating mode and determining the magnitude of the complex voltage space vector while operating in the closed-loop operating mode for steady state.

17. The method of claim 14, further comprising forcing a stator flux of the motor to be perpendicular to a rotor flux of the motor via a hysteresis controller, while operating in the closed-loop operating mode.

18. The method of claim 14, further comprising changing the magnitude of the complex voltage space vector when switching between open loop operation and closed loop operation.

19. The method of claim 14, further comprising receiving the plurality of control signals at a pulse-width modulation (PWM) unit, and outputting a PWM signal at the PWM unit to adjust the rotational position and/or speed of the motor.

20. The method of claim 14, further comprising receiving a PWM signal at a voltage source inverter component, and outputting three-phase sinusoidal waveforms to windings of the motor to adjust the rotational position and/or speed of the motor.

21. The method of claim 14, further comprising transforming motor winding current value coordinates to a stationary two-phase reference frame at a Clarke Transform module.

22. The method of claim 14, further comprising starting the motor in the open-loop operating mode using a voltage per frequency control, ramping up the motor speed to a user-defined speed, and switching to the closed-loop operating mode for steady-state operation of the motor.

23. The method of claim 22, further comprising tracking the maximum energy efficiency of the motor after reaching the user-defined speed, including changing the angle of the vector quantity at a constant speed and concurrently controlling the magnitude of the vector quantity to force a stator flux of the motor to be perpendicular to a rotor flux of the motor, and transitioning to the closed-loop operating mode for steady-state operation of the motor.

* * * * *